(12) United States Patent
Nakano et al.

(10) Patent No.: US 9,634,899 B2
(45) Date of Patent: Apr. 25, 2017

(54) FUNCTION UPDATE METHOD AND FUNCTION UPDATE SYSTEM

(71) Applicant: Panasonic Intellectual Property Management Co., Ltd., Osaka (JP)

(72) Inventors: Toshihisa Nakano, Osaka (JP); Motoji Ohmori, Osaka (JP); Masayuki Kozuka, Osaka (JP); Masao Nonaka, Osaka (JP); Ryota Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 165 days.

(21) Appl. No.: 14/429,507

(22) PCT Filed: Sep. 11, 2013

(86) PCT No.: PCT/JP2013/005384
§ 371 (c)(1),
(2) Date: Mar. 19, 2015

(87) PCT Pub. No.: WO2014/049994
PCT Pub. Date: Apr. 3, 2014

(65) Prior Publication Data
US 2015/0236913 A1    Aug. 20, 2015

Related U.S. Application Data

(60) Provisional application No. 61/707,148, filed on Sep. 28, 2012.

(51) Int. Cl.
*H04L 12/24* (2006.01)
*H04L 29/08* (2006.01)

(52) U.S. Cl.
CPC .......... *H04L 41/0893* (2013.01); *H04L 67/10* (2013.01)

(58) Field of Classification Search
CPC ..... H04L 67/10; H04L 67/306; H04L 67/303; H04L 12/2816; H04L 41/0893
(Continued)

(56) References Cited

U.S. PATENT DOCUMENTS

2003/0100962 A1* 5/2003 Sumita ............... H04L 12/2803
700/65
2004/0111496 A1* 6/2004 Han .................... H04L 12/2803
709/220
(Continued)

FOREIGN PATENT DOCUMENTS

JP    2002-78036    3/2002
JP    2002-85886    3/2002
(Continued)

OTHER PUBLICATIONS

International Search Report (ISR) issued Dec. 3, 2013 in International (PCT) Application No. PCT/JP2013/005384.
(Continued)

*Primary Examiner* — Ruolei Zong
(74) *Attorney, Agent, or Firm* — Wenderoth, Lind & Ponack, L.L.P.

(57) ABSTRACT

A function update method improving household appliance functions by enabling new and existing household appliances to perform cooperative processing. In the method, a server stores registration information listing identification information for each household appliance owned by a user, combination information listing combinations each including household appliances performing cooperative processing, and update information for each household appliance in each combination, for updating a function for performing the cooperative processing. The method includes: receiving, from a household appliance having identification informa-
(Continued)

tion not listed in the registration information, a request to list the identification information in the registration information, and listing the identification information in the registration information; selecting a combination listed in the combination information, the combination including the household appliance and all other household appliances in the combination being registered in the registration information; and transmitting update information to each household appliance requiring a function update in the combination.

7 Claims, 25 Drawing Sheets

(58) Field of Classification Search
USPC .......................................................... 709/223
See application file for complete search history.

(56) References Cited

U.S. PATENT DOCUMENTS

2006/0229739 A1* 10/2006 Morikawa ............ G05B 13/027
  700/19
2006/0248162 A1* 11/2006 Kawasaki ................. G06F 8/65
  709/217
2010/0058326 A1   3/2010 Dei et al.
2012/0306661 A1* 12/2012 Xue ..................... G05B 19/042
  340/870.02

FOREIGN PATENT DOCUMENTS

JP    2006-33135    2/2006
JP    2010-55275    3/2010

OTHER PUBLICATIONS

Takeshi Saito et al., "Home Network Content Protection", Toshiba Review, vol. 58, No. 6, pp. 12-15, Jun. 1, 2003.

* cited by examiner

FIG. 4

| Registered Device ID | Added Module ID |
|---|---|
| 1 | M11 |
| 2 |  |
| 3 | M31 |

FIG. 6

| Function ID | Device ID | Module ID | | |
|---|---|---|---|---|
| A001 | 1 | M11 | ← 611 | ⎫ |
| | 3 | M31 | ← 612 | ⎬ 631 |
| | 3 | M32 | ← 613 | |
| | 4 | M41 | ← 614 | ⎭ |
| A002 | 1 | M11 | ← 615 | ⎫ 632 |
| | 3 | M31 | ← 616 | ⎭ |
| A003 | 2 | M21 | ← 617 | ⎫ |
| | 3 | M33 | ← 618 | ⎬ 633 |
| | 5 | M51 | ← 619 | ⎭ |
| A004 | 2 | M21 | ← 620 | ⎫ 634 |
| | 5 | M51 | ← 621 | ⎭ |
| ⋮ | ⋮ | ⋮ | | |

FIG. 7

| Device ID | Module ID | Module Data | Module Description |
|---|---|---|---|
| 1 | M11 | Module 11 | Brightness notification function + External brightness control function |
|  | ⋮ | ⋮ | ⋮ |
| 2 | M21 | Module 21 | Power ON notification function |
|  | ⋮ | ⋮ | ⋮ |
| 3 | M31 | Module 31 | Genre notification function + External playback control function |
|  | M32 | Module 32 | Fax reception OSD display function |
|  | M33 | Module 33 | Power ON notification function |
|  | ⋮ | ⋮ | ⋮ |
| 4 | M41 | Module 41 | Fax reception notification function |
|  | ⋮ | ⋮ | ⋮ |
| 5 | M51 | Module 51 | External wind flow control function |
|  | ⋮ | ⋮ | ⋮ |
| ⋮ | ⋮ | ⋮ | ⋮ |

FIG. 14

| Device Group ID | Device ID Combo | | | | Function ID | Validity Flag | Added Function Description |
|---|---|---|---|---|---|---|---|
| ⋮ | ⋮ | ⋮ | ⋮ | ⋮ | ⋮ | ⋮ | ⋮ |
| 25 | 6 | 7 | | | A121 | 0 | Measurement data upload function |
| 26 | 6 | 8 | | | A122 | 0 | Menu change function |
| ⋮ | ⋮ | ⋮ | ⋮ | ⋮ | ⋮ | ⋮ | ⋮ |

FIG. 15

| Function ID | Device ID | Module ID |
|---|---|---|
| ⋮ | ⋮ | ⋮ |
| A121 | 6 | M61 |
| | 7 | M71 |
| A122 | 6 | M62 |
| ⋮ | ⋮ | ⋮ |

FIG. 16

| Device ID | Module ID | Module | Module Description |
|---|---|---|---|
| ⋮ | ⋮ | ⋮ | ⋮ |
| 6 | M61 | Module 61 | Calorie information upload function |
|  | M62 | Module 62 | Menu update function |
|  | ⋮ | ⋮ | ⋮ |
| 7 | M71 | Module 71 | Body composition upload function |
|  | ⋮ | ⋮ | ⋮ |
| ⋮ | ⋮ | ⋮ | ⋮ |

FIG. 17

| Date | Calories | Weight | Body fat percentage |
|---|---|---|---|
| August 1, 2013, 7:00 AM | 300 | | |
| August 1, 2013, 12:00 PM | 1000 | | |
| August 1, 2013, 7:00 PM | 2000 | | |
| August 1, 2013, 9:00 PM | | 78.0 | 23 |
| August 2, 2013, 7:25 AM | 400 | | |
| ⋮ | ⋮ | ⋮ | ⋮ |

FIG. 18

Health diary for Suzuki

| Date | Calories | Weight | Body fat percentage |
|---|---|---|---|
| August 1, 2013, 7:00 AM | 300 kcal | | |
| August 1, 2013, 12:00 PM | 1000 kcal | | |
| August 1, 2013, 7:00 PM | 2000 kcal | | |
| August 1, 2013, 9:00 PM | | 78.0 kg | 23% |
| August 2, 2013, 7:25 AM | 400 kcal | | |

FIG. 23

| Device ID | Version | Program | Function ID |
|---|---|---|---|
| 1 | v100 | Program P100 | — |
| | v101 | Program P101 | A001 |
| | ⋮ | ⋮ | ⋮ |
| 2 | v100 | Program P200 | — |
| | v101 | Program P201 | A003 |
| | ⋮ | ⋮ | ⋮ |
| 3 | v100 | Program P300 | — |
| | v101 | Program P301 | A001, A003　←─2301 |
| | v102 | Program P302 | A001 |
| | v103 | Program P303 | A003 |
| | ⋮ | ⋮ | ⋮ |
| 4 | v100 | Program P400 | — |
| | v101 | Program P401 | A001 |
| | ⋮ | ⋮ | ⋮ |
| 5 | v100 | Program P500 | — |
| | v101 | Program P501 | A004 |
| | ⋮ | ⋮ | ⋮ |
| ⋮ | ⋮ | ⋮ | ⋮ |

FUNCTION UPDATE METHOD AND FUNCTION UPDATE SYSTEM

This application is the National Stage of International Application No. PCT/JP2013/005384, filed Sep. 11, 2013, which claims the benefit of U.S. Provisional Application No. 61/707,148, filed Sep. 28, 2012.

TECHNICAL FIELD

The present disclosure pertains to technology for improving a function of a household appliance in response to a change in a combination of household appliances owned by a user.

BACKGROUND ART

Examples of cooperative processes currently performed include: when a television and a Bluray® Disc player (hereinafter, BD) are connected, automatically powering on the television once the BD player is powered ON; and when a television and a ceiling light are connected, automatically dimming the ceiling light once the television is powered ON.

As such, in order to perform cooperative processing in a plurality of household appliances, such a television, a BD recorder, and a ceiling light, a control program for performing the cooperative processing must be incorporated into each of the household appliances in advance (see Non-Patent Literature 1).

CITATION LIST

[Non-Patent Literature]
[Non-Patent Literature 1]
SAITO Takeshi, ISOZAKI Hiroshi, Copyright Protection in Home Network (Toshiba Review Vol. 58 No. 6), Jun. 1, 2003, Toshiba, pp. 12-15.

SUMMARY OF INVENTION

Technical Problem

When the user has purchased a new household appliance, cooperative processing by the new household appliance and another household appliance originally present in the home of the user requires that a control program be present in each of the household appliances that perform the cooperative processing.

However, a typical household appliance is unlikely to be equipped upon delivery with a control program enabling cooperative processing with all types of other household appliances. Thus, despite having purchased a new household appliance, the user is frequently unable to perform cooperative processing with the new household appliance and the household appliances originally in the home.

Thus, the present disclosure has been achieved in consideration of the above-described problem, and an aim thereof is to provide a function update method enabling functions of household appliances to be improved in order to perform cooperative processing with a new household appliance and a household appliance originally present in the home.

Solution to Problem

In order to solve the above-described problem, the present disclosure provides a function update method updating a function of a household appliance registered on a server, wherein the server stores: registration information listing identification information for each of a plurality of household appliances owned by a user; combination information listing a plurality of combinations, each combination including a plurality of household appliances performing cooperative processing; and update information for each household appliance included in each of the combinations, for updating a function for performing the cooperative processing, the function update method includes: receiving, from a given household appliance having identification information not listed in the registration information, a request to list the identification information for the given household appliance in the registration information, and listing the identification information for the given household appliance in the registration information; selecting a given combination among the combinations listed in the combination information, the given combination including the given household appliance and all other household appliances in the given combination being registered in the registration information; and transmitting update information to each household appliance requiring a function update in the given combination.

Advantageous Effects of Invention

According to the above-described configuration, the function update method of the disclosure is able to perform cooperative processing by improving a function in accordance with a given household appliance that is already registered in the registered information and another household appliance, despite the given household appliance not being provided in advance with a function for cooperative processing with the other household appliance.

BRIEF DESCRIPTION OF DRAWINGS

FIG. 4 depicts a device registration table pertaining to Embodiment 1 of the present disclosure.

FIG. 6 depicts an addition module table pertaining to Embodiment 1 of the present disclosure.

FIG. 7 depicts an example of module information pertaining to Embodiment 1 of the present disclosure.

FIG. 14 depicts a cooperative processing registration table pertaining to Embodiment 2 of the present disclosure.

FIG. 15 depicts an addition module table pertaining to Embodiment 2 of the present disclosure.

FIG. 16 depicts an example of module information pertaining to Embodiment 2 of the present disclosure.

FIG. 17 depicts an example of personal health data pertaining to Embodiment 2 of the present disclosure.

FIG. 18 depicts an example of personal health data displayed by a browser, pertaining to Embodiment 2 of the present disclosure.

FIG. 23 depicts an example of a program version table representing a correspondence between a program version and a function of a program, pertaining to a variation of the present disclosure.

DESCRIPTION OF EMBODIMENTS

1. Embodiment 1

1-1. Overview

A function update system 1 pertaining to an Embodiment of the present disclosure is a system for performing cooperative processing between a household appliance originally placed in a home and a newly-purchased household appliance belonging to a user. The function update system 1 performs cooperative processing by adding a function necessary for executing the cooperative processing to each household appliance and having a server control the execution of processing based on the function added to the household appliance. Here, the term cooperative processing refers to a group of processes respectively executed by the household appliances.

Figure 1:
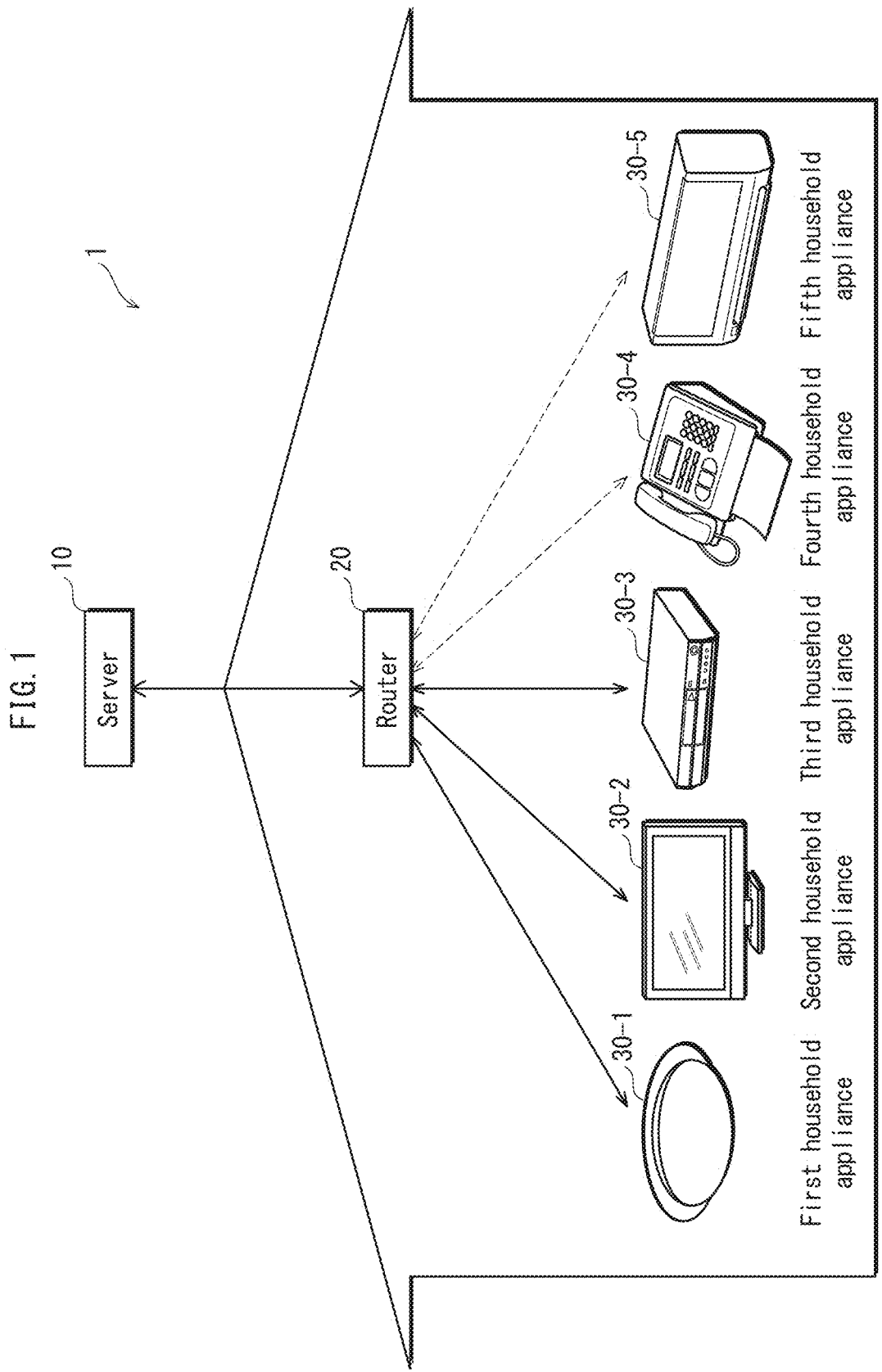
FIG. 1 depicts the configuration of a function update system pertaining to Embodiment 1 of the present disclosure.

The function update system 1 is described below with reference to the accompanying drawings. As depicted in FIG. 1, the function update system 1 includes a server 10, a router 20, and household appliances denoted a first household appliance 30-1 through a fifth household appliance 30-5. The server 10 is installed outside the home of the user and is connected to the router 20, which is inside the home, via a network. Inside the home, the household appliances, namely the first household appliance 30-1 through the fifth household appliance 30-5, are each connected to the router 20 through a network. Specifically, the first household appliance 30-1 is a ceiling light. The second household appliance 30-2 is a television. The third household appliance 30-3 is a BD player. The fourth household appliance 30-4 is a fax machine, and the fifth household appliance 30-5 is an air conditioner. The first household appliance 30-1, the second household appliance 30-2, and the third household appliance 30-3 are originally installed in the home, while the fourth household appliance 30-4 and the fifth household appliance 30-5 are newly purchased by the user and added to the home. The household appliances each have a communication function that uses a network, and communicate with the server 10 via the router 20. The household appliances do not communicate with other household appliances.

The server 10 stores a database concerning the cooperative processing performable by each combination of household appliances available on the market. Upon detecting that one of the fourth household appliance 30-4 and the fifth household appliance 30-5 has been added to the function update system 1, the server 10 references the database and specifies cooperative processing that is newly performable by the newly-added household appliance and the household appliances originally in the home. The server 10 then transmits a program for performing the newly-performable cooperative processing to each of the household appliances in the home. The household appliances each receive and store the program transmitted by the server 10, thereby updating the function of that household appliance. Once the function of the household appliances has been updated, the server 10 controls the household appliances to perform the newly-updated function.

<Cooperative Processing>

An overview of the cooperative processing performed by a plurality of household appliance combinations in the home is provided below. As examples of the cooperative processing, the household appliances in the home execute a lighting adjustment process, a fax viewing support process, and a temperature adjustment process.

Figure 10:
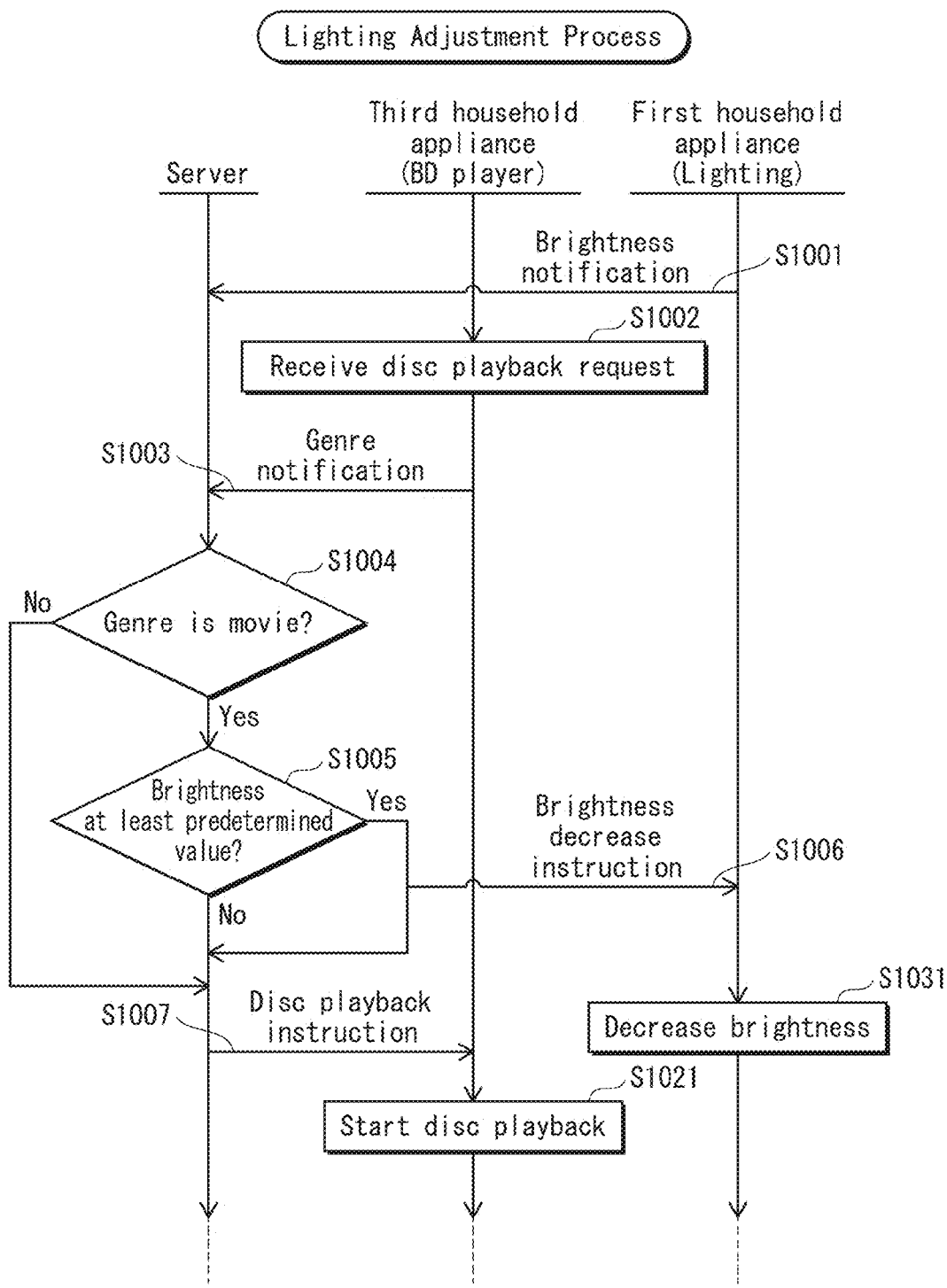
FIG. 10 is a flowchart representing a lighting adjustment process pertaining to Embodiment 1 of the present disclosure.

(1) Lighting Adjustment Process (See FIG. 10)

The lighting adjustment process is a process of adjusting the lighting to suggest a movie theater atmosphere when the user is viewing a movie. The lighting adjustment process is executed by a combination of the first household appliance 30-1, the second household appliance 30-2, and the third household appliance 30-3. Specifically, the lighting adjustment process involves the first household appliance 30-1 (the ceiling light) reducing a luminous brightness of a light source (hereinafter simply termed lighting brightness) when the third household appliance 30-3 (the BD player) has begun to playback content of a movie genre.

Figure 11:
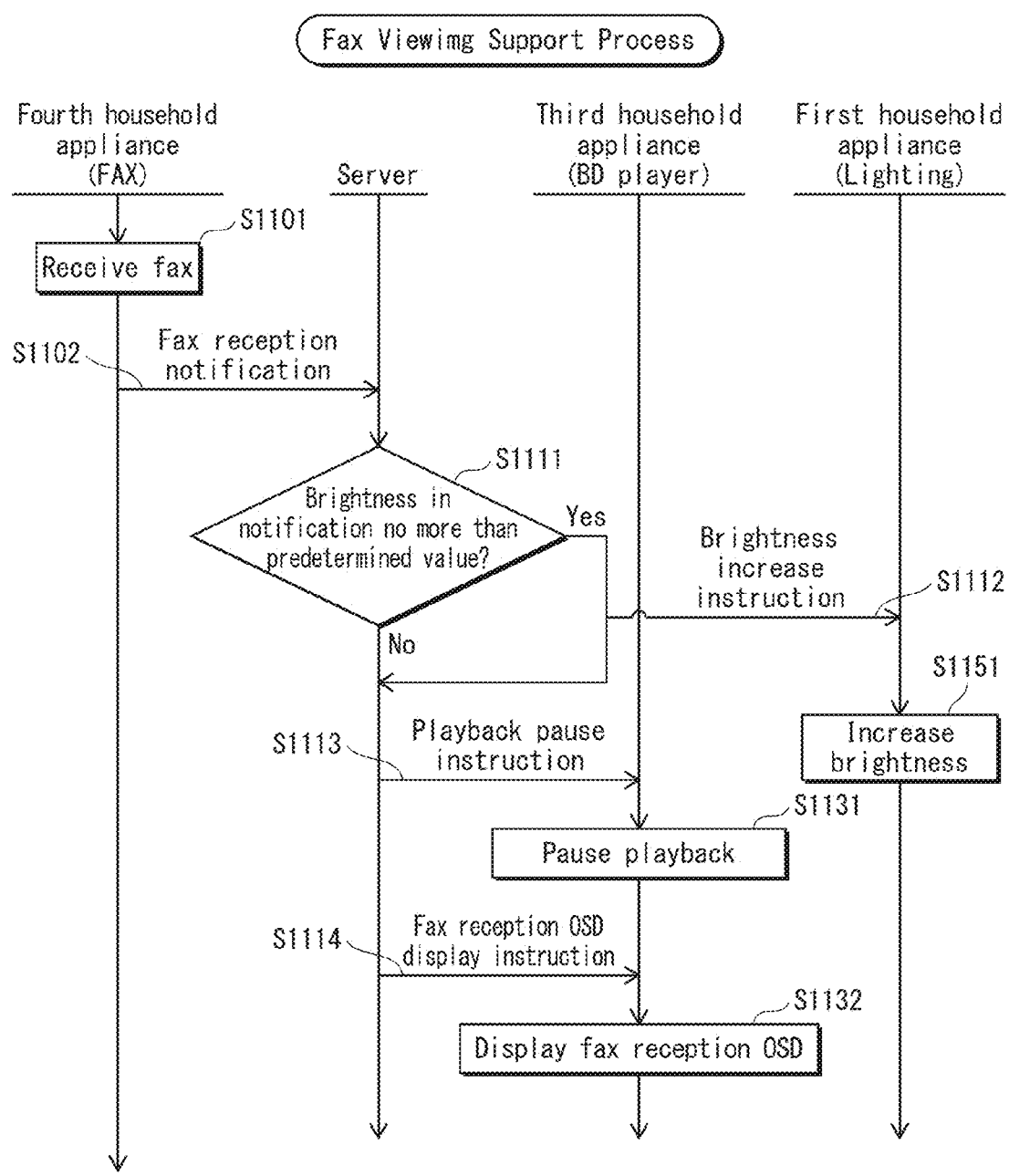
FIG. 11 is a flowchart representing a fax viewing support process pertaining to Embodiment 1 of the present disclosure.

(2) Fax Viewing Support Process (See FIG. 11)

The fax viewing support process is executed when a fax is received while the lighting brightness is low due to the above-described lighting adjustment process, and involves making a clear notification to the user regarding such reception and increasing the lighting brightness to assist the user in viewing the fax. The fax viewing support process is executed by a combination of the first household appliance 30-1, the second household appliance 30-2, the third household appliance 30-3, and the fourth household appliance 30-4. Specifically, the fax viewing support process is executed once the fourth household appliance 30-4 (the fax machine) receives a fax, and involves the third household appliance 30-3 pausing playback and outputting a video signal to the second household appliance 30-2 (the television) for an on-screen display (hereinafter, OSD) indicating that a fax has been received. The first household appliance 30-1 then increases the lighting brightness.

Figure 12:
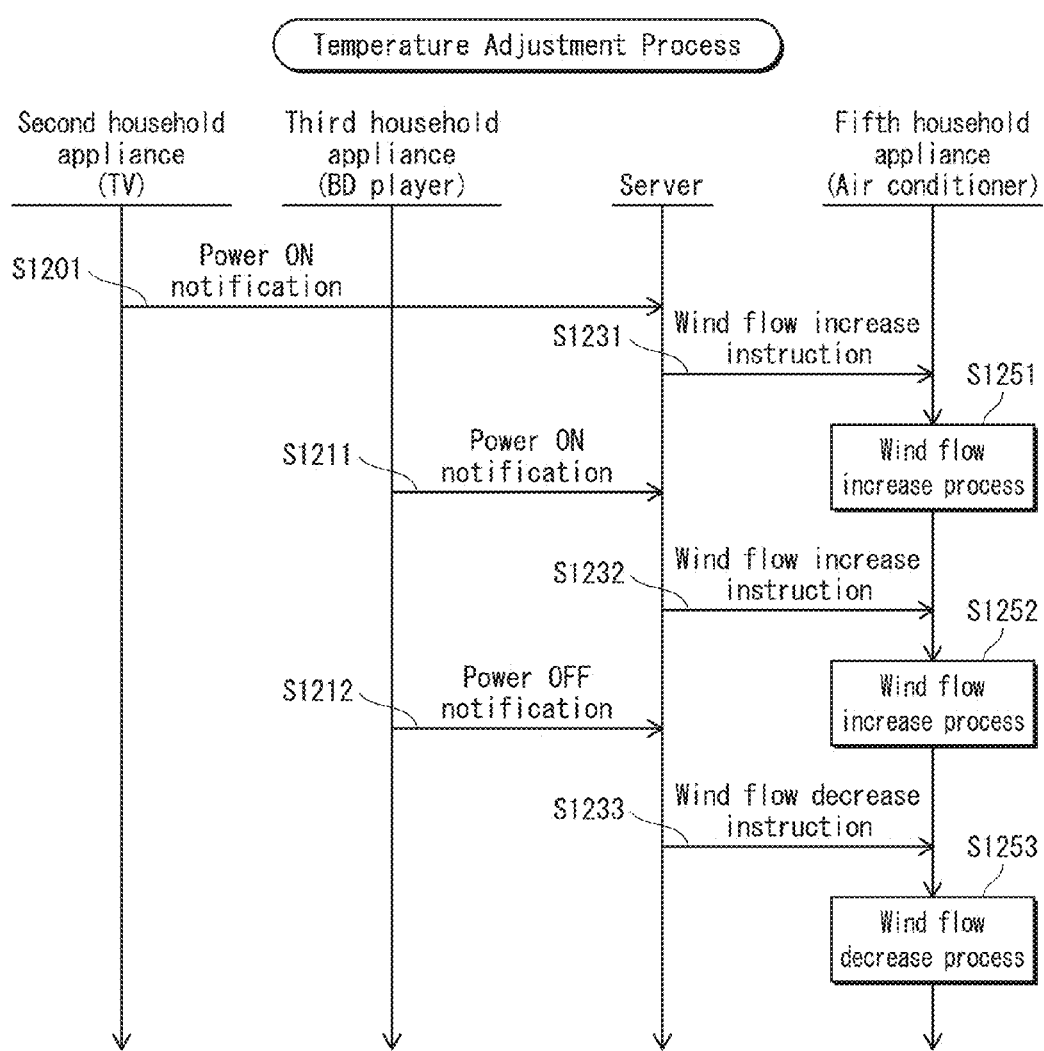
FIG. 12 is a flowchart representing a temperature adjustment process pertaining to Embodiment 1 of the present disclosure.

(3) Temperature Adjustment Process (See FIG. 12)

The temperature adjustment process involves maintaining a constant room temperature once at least one of the second household appliance 30-2 and the third household appliance 30-3 has changed from a standby mode to an ON mode. The temperature adjustment processing is executed by the fifth household appliance 30-5 (the air conditioner) and at least one of the second household appliance 30-2 and the third household appliance 30-3. Specifically, the temperature adjustment process involves increasing wind flow output by the fifth household appliance 30-5 when the second household appliance 30-2 changes from the standby mode to the ON mode. The temperature adjustment processing also involves increasing the wind flow output by the fifth household appliance 30-5 when the third household appliance 30-3 changes from the standby mode to the ON mode. Accordingly, stronger cooling is performed before the temperature of the home increases, thus maintaining a constant temperature in the home. The temperature adjustment processing is executed when the fifth household appliance 30-5 is operating in a cooling mode.

This concludes the overview. The respective configurations of the server 10, the router 20, and the household appliances 30-1 through 30-5 are described below, along with the applicable data configurations.

1-2. Server 10

The server 10 is a device for performing cooperative processing by controlling the household appliances in the home (i.e., the household appliances 30-1 through 30-5). The server 10 is described below.

1-2-1. Configuration

Figure 2:
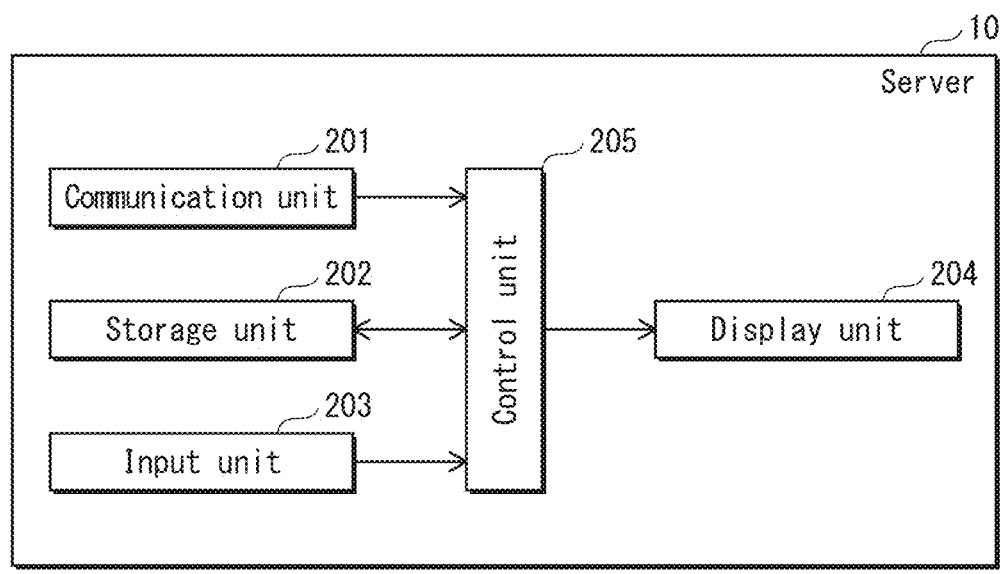
FIG. 2 is a block diagram depicting the configuration of a server pertaining to Embodiment 1 of the present disclosure.

The server 10 is realized as a computer having a functional configuration that, as depicted in FIG. 2, includes a communication unit 201, a storage unit 202, an input unit 203, a display unit 204, and a control unit 205.

(1) Communication Unit 201

The communication unit 201 is realized as a communication large-scale integration (hereinafter, LSI) that is connected to the router 20 via a network. The communication unit 201 transmits and receives data among the household appliances 30-1 through 30-5 via the network and the router 20.

(2) Storage Unit 202

The storage unit 202 is realized as a non-volatile storage medium such as flash memory or a hard disk drive, and stores data. The storage unit 202 stores a device registration table (see FIG. 4), a cooperative processing configuration table (see FIG. 5), an addition module table (see FIG. 6), and module information (see FIG. 7) as data. The device registration table, the cooperative processing configuration table, the addition module table, and the module information are described in detail later.

(3) Input Unit 203

The input unit 203 is realized as an input device, such as a keyboard. The input unit 203 acquires a user instruction input by the user operating the keyboard and notifies the control unit 205 of the acquired user instruction.

(4) Display Unit 204

The display unit 204 is realized as a display and a display control LSI. The display is, for example, a liquid crystal display. The display control LSI acquires data representing an image and causes the display to display the image in accordance with the acquired data.

(5) Control Unit 205

The control unit 205 includes a processor and memory, and controls the overall operations of the server 10. Here, the control unit 205 performs functions by having the processor execute a program stored in the memory.

The main functions of the control unit 205 are device registration, function addition, and cooperative processing control.

(1) Device Registration Function

Device registration involves receiving a registration request from one of the household appliance and writing a device ID in the registration request from that household appliance into the device registration table. The device registration processing of this device registration function corresponds to step S801 of FIG. 8.

In the following explanations, the process of writing the device ID into the device registration table is referred to as registering the device ID.

(B) Function Addition Function

Function addition involves determining that cooperative processing is performable by adding a household appliance to another household appliance originally in the home, and adding a necessary function for performing the cooperative processing to the household appliances. The function addition processing of this function addition function corresponds to steps S802 through S844 of FIG. 8 and to FIG. 9.

(C) Cooperative Processing Control Functions

Cooperative processing control involves controlling the household appliances to which a function has been added using the above-described function addition function in order to perform the cooperative processing. Examples of the cooperative processing control functions performed by the control unit 205 include lighting adjustment control, fax viewing support control, and temperature adjustment control.

(a) Lighting Adjustment Control Function

The lighting adjustment control involves controlling the first household appliance 30-1, the second household appliance 30-2, and the third household appliance 30-3 in order to perform the lighting adjustment process, among the cooperative processing examples discussed above. The lighting adjustment control corresponds to steps S1001 and S1003 through S1007 of FIG. 10.

(b) Fax Viewing Support Control Function

The fax viewing support control involves controlling the first household appliance 30-1, the second household appliance 30-2, the third household appliance 30-3, and the fourth household appliance 30-4 in order to perform the fax viewing support process, among the cooperative processing examples discussed above. The fax viewing support control corresponds to steps S1102 and S1111 through S1114 of FIG. 11.

(c) Temperature Adjustment Control Function

The temperature adjustment control involves controlling the second household appliance 30-2, the third household appliance 30-3, and the fifth household appliance 30-5 in order to perform the temperature adjustment processing, among the cooperative processing examples discussed above. The temperature adjustment control corresponds to steps S1201, S1211, S1212, and S1231 through S1233 of FIG. 12.

1-2-2. Data Configuration (1) Device Registration Table

As depicted in FIG. 4, the device registration table lists a registered device ID and an added module ID, in association. The registered device ID is the device ID of the household appliance that has transmitted a registration request to the server 10. The device ID is identification information allocated to the household appliance in advance for identification purposes. The added module ID is a module ID of a module that has already been transmitted by the server 10 to the household appliance identified by the corresponding registered device ID. Here, a module is a group of execution instructions interpreted by a computer of the household appliance. The module ID is identification information allocated to the module in advance for identification purposes.

(2) Cooperative Processing Configuration Table

Figure 5:
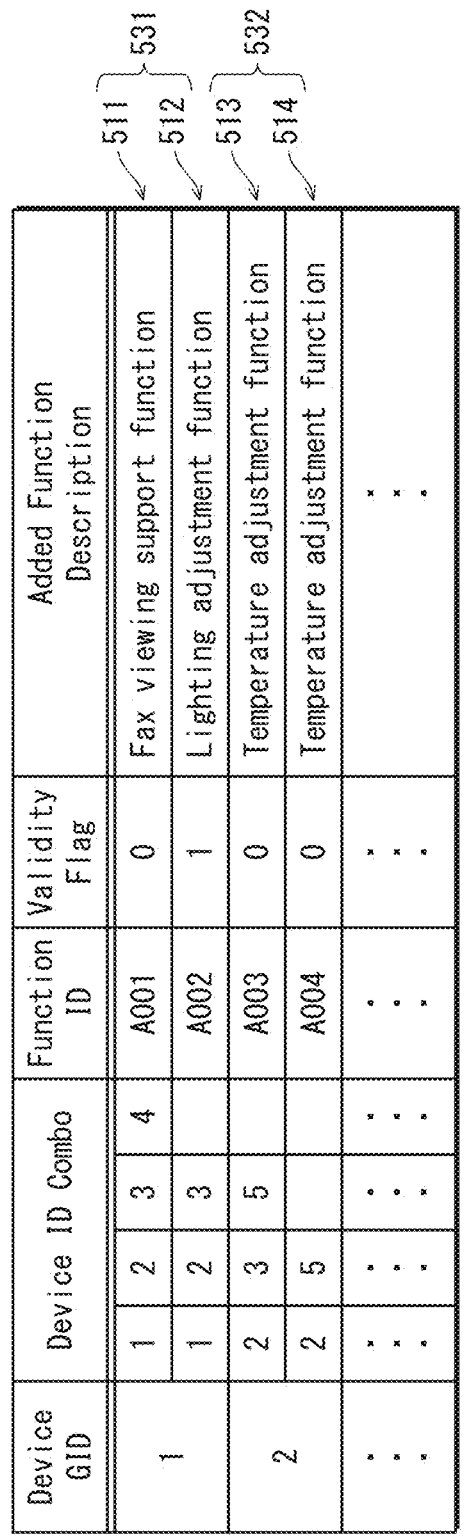
FIG. 5 depicts a cooperative processing registration table pertaining to Embodiment 1 of the present disclosure.

The cooperative processing configuration table is a database representing combinations of household appliances able to perform the cooperative processing among household appliances available on the market. As depicted in FIG. 5, the cooperative processing configuration table lists a device GID, a device ID combination (also termed a device ID combo), a function ID, a validity flag, and an added function description, in association. Each row (entry) in the cooperative processing configuration table corresponds to one type of cooperative processing (see entries 511 through 514). Entry groups 531 and 532 include a plurality of entries having the same function GID.

The function GID is identification information for identifying groups when a plurality of functions have been grouped. When a device ID combination pertaining to a given function includes the entire device ID combination pertaining to another function, then both functions are regrouped as one.

The device ID combination includes the device IDs of all household appliances able to perform the cooperative processing.

The function ID is identification information for identifying a function performable through cooperative processing.

The validity flag indicates whether or not the function identified by the function ID in the same entry is valid. A value of 1 for the validity flag indicates that the function is valid, and a value of 0 for the validity flag indicates that the function is not valid.

The added function description is text clearly describing the function identified by the function ID. The added function description is provided for ease of understanding and convenience in realizing the present Embodiment, and need not necessarily be actually provided.

(3) Addition Module Table

For each type of cooperative processing, the addition module table lists a module to be transmitted in order to perform the cooperative processing along with a destination. As depicted in FIG. 6, the addition module table lists a function ID, a device ID, and a module ID in association. Each entry 611 through 621 in the addition module table corresponds to one module, and each entry group 631 through 634 corresponds to one function.

The function ID is as described above in relation to the cooperative processing configuration table. The device ID is as described above in relation to the device registration table. The module ID is also as described above in relation to the device registration table. The module identified by the module ID is transmitted to the household appliance identified by the device ID in the same entry.

(4) Module Information

As depicted in FIG. 7, the module information is configured from a device ID, a module ID, and module data. The function ID is as described above in relation to the cooperative processing configuration table. The function ID is used to specify the household appliance that is the destination for the module. The module ID is also as described above in relation to the device registration table. The module ID is used to specify a module to be transmitted to the household appliance identified by the device ID in the same entry. The module data is the actual module identified by the module ID.

The module description is text clearly describing the module identified by the module ID. The module description is provided for ease of understanding and convenience in realizing the present Embodiment, and need not necessarily be actually provided.

The functions of the module data are described next.

(A) Module 11

Module 11 is a group of execution instructions interpreted by a computer of the first household appliance 30-1. The first household appliance 30-1 is operated in accordance with the execution instructions making up module 11, thereby performing functions of a brightness notification and an external brightness control.

The brightness notification function involves transmitting a brightness notification representing the brightness of the lighting by the household appliance to the server 10 (see step S1001 of FIG. 10). The external brightness control function involves receiving a brightness change instruction from the server 10, and changing the brightness of the lighting by the household appliance to the server 10 (see steps S1006 and S1031 of FIG. 10).

(B) Module 21

Module 21 is a group of execution instructions interpreted by a computer of the second household appliance 30-2. The second household appliance 30-2 is operated in accordance with the execution instructions making up module 21, thereby performing functions of a power ON notification. The power ON notification function involves transmitting a power ON notification to the server 10 indicating that the power has been switched ON, when there is a change in status of the household appliance from standby to ON (see step S1201 of FIG. 12).

(C) Module 31

Module 31 is a group of execution instructions interpreted by a computer of the third household appliance 30-3. The third household appliance 30-3 is operated in accordance with the execution instructions making up module 31, thereby performing functions of a genre notification and an external playback control.

The genre notification function involves acquiring a genre of a movie recorded on a disc that has been inserted into the household appliance and, once the user makes an instruction to begin disc playback, transmitting a genre notification to the server 10 indicating the acquired genre (see steps S1002 and S1003 of FIG. 10).

The external playback control function involves receiving an external playback control instruction, such as a playback pause instruction to pause playback of the BD, a playback start instruction to start playback of the BD, and a playback stop instruction to stop playback of the BD, and executing playback control such as pausing, starting, or stopping the playback of the BD in accordance with the external playback control instruction (see steps S1113 and S1131 of FIG. 11).

(D) Module 32

Module 32 is a group of execution instructions interpreted by a computer of the third household appliance 30-3, and includes data for displaying an image as a fax reception OSD. The third household appliance 30-3 is operated in accordance with the execution instructions making up module 32, thereby performing a function of fax reception OSD display.

The fax reception OSD display function is performed upon receiving a fax reception OSD display instruction from the server 10, and involves outputting a signal representing the fax reception OSD to the second household appliance 30-2 and displaying the fax reception OSD on the display unit 304 of the second household appliance 30-2 (see steps S1114 and S1132 of FIG. 11).

(E) Module 33

Module 33 is a group of execution instructions interpreted by a computer of the third household appliance 30-3. The third household appliance 30-3 is operated in accordance with the execution instructions making up module 33, thereby performing a function of a power ON notification. The power ON notification function involves transmitting a power ON notification to the server 10 indicating that the power has been switched ON when there is a change in status of the household appliance from standby to ON (see step S1211 of FIG. 12). The power ON notification function involves transmitting a power ON notification to the server 10 indicating that the power has been switched ON, when there is a change in status of the household appliance from standby to ON (see step S1201 of FIG. 12).

(F) Module 41

Module 41 is a group of execution instructions interpreted by a computer of the fourth household appliance 30-4. The fourth household appliance 30-4 is operated in accordance with the execution instructions making up module 41, thereby performing a function of fax reception notification. The fax reception notification function is performed upon receiving a fax, and involves transmitting a fax reception notification indicating that a fax has been received to the server 10 (see steps S1101 and S1102 of FIG. 11).

(G) Module 51

Module 51 is a group of execution instructions interpreted by a computer of the fifth household appliance 30-5. The fifth household appliance 30-5 is operated in accordance with the execution instructions making up module 51, thereby performing a function of external wind flow control.

The external wind flow control function involves receiving a wind flow change instruction, such as a wind flow increase instruction to increase wind flow or a wind flow decease instruction to decrease wind flow, and increasing or decreasing the output wind flow in accordance with the wind flow change instruction (see steps S1231 through S1233 and steps S1251 through S1253 of FIG. 12).

1-3 Household Appliances 30-1 Through 30-5

The first household appliance 30-1, the second household appliance 30-2, the third household appliance 30-3, the fourth household appliance 30-4, and the fifth household appliance 30-5 are the household appliances executing the processing making up the cooperative processing. These household appliances each have an individual function unit 305 performing the main function of that household appliance (e.g., a dimming function for the ceiling light, a broadcast reception and playback function for the television, and so on) and share a common configuration for components other than the individual function unit 305. As such, the individual function unit 305 is described below for each of the household appliances. The other components are described using the first household appliance 30-1 as a representative example.

Figure 3:
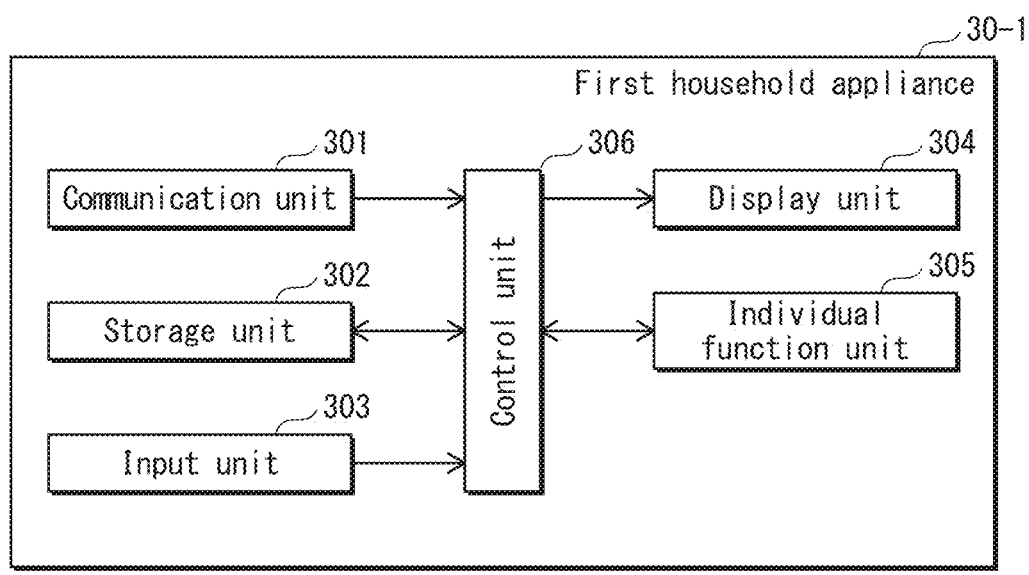
FIG. 3 is a block diagram depicting the configuration of a first household appliance pertaining to Embodiment 1 of the present disclosure.

As depicted in FIG. 3, the first household appliance 30-1 includes a communication unit 301, a storage unit 302, an input unit 303, a display unit 304, the individual function unit 305, and a control unit 306.

(1) Communication Unit 301

The communication unit 301 is realized as a communication LSI and performs transmission and reception of data via a network.

(2) Storage Unit 302

The storage unit 302 is realized as a non-volatile storage medium such as flash memory or a hard disk drive, and stores data thereon. The storage unit 302 stores, as data, a program for controlling the overall operations of the first household appliance 30-1 that is executed by the control unit 306, a module received from the server 10, the device ID identifying the household appliance, and so on.

(3) Input Unit 303

The input unit 303 is configured as an input device such as a remote control, an optical unit for a remote control signal, a touch panel, a keyboard, or similar. The input unit 303 acquires a user instruction input by the user operating the remote control, touch panel, keyboard, or similar and notifies the control unit 306 of the acquired user instruction.

(4) Display Unit 304

The display unit 304 is configured as a display device displaying information and a control LSI. The display device is, for example, configured as a liquid crystal display or a light emitting diode (hereinafter, LED).

(5) Individual Function Unit 305

The individual function unit 305 performs the individual function of the respective household appliances 30-1 through 30-5 (hereinafter simply termed individual functions). The individual functions for each of the household appliances are separately explained below.

(A) First Household Appliance 30-1

The first household appliance 30-1 is a ceiling light, as described above. The individual functions thereof include a dimming function of changing the brightness emitted by the light source, a tone adjustment function of adjusting a color of the light emitted by the light source on a spectrum from daylight to warm white, and other typical ceiling light functions.

Also, as described above, the brightness notification and external brightness control functions are added as individual functions upon receiving module 11 from the server 10.

(B) Second Household Appliance 30-2

The second household appliance 30-2 is a television, as described above. The individual functions thereof include a broadcast reception and playback function of receiving a television broadcast, demodulating the broadcast, and displaying images on the display unit 304 for playback, a video playback function of displaying an image signal received as external input for playback on the display unit 304, and other typical television functions.

Also, as described above, the power ON notification function is added as an individual function upon receiving module 21 from the server 10.

(C) Third Household Appliance 30-3

The third household appliance 30-3 is a BD player, as described above. The individual functions thereof include a BD playback function of outputting content recorded on a BD for playback and other typical BD player functions.

Also, as described above, the genre notification and external playback control functions are added as individual functions upon receiving module 31 from the server 10. Further, the fax reception OSD display function is added as an individual function upon receiving module 32 from the server 10. In addition, the power ON notification function is added as an individual function upon receiving module 33 from the server 10.

(D) Fourth Household Appliance 30-4

The fourth household appliance 30-4 is a fax machine, as described above. The individual functions thereof include a fax transmission and reception function of transmitting and receiving a fax through a telephone line, a telephone function of enabling the user to communicate with another party through the telephone line, and other typical fax machine functions.

Also, as described above, the fax reception notification function is added as an individual function upon receiving module 41 from the server 10.

(E) Fifth Household Appliance 30-5

The fifth household appliance 30-5 is an air conditioner, as described above. The individual functions thereof include a cooling function, a warming function, a temperature setting function, a wind flow setting function, and other typical air conditioner functions. Also, as described above, the external wind flow control function is added as an individual function upon receiving module 51 from the server 10.

(6) Control Unit 306

The control unit 306 includes a processor and memory, and controls the overall operations of the first household appliance 30-1. Here, the control unit 306 performs functions by having the processor execute a program stored in the memory.

The control unit 306 also receives a module from the server 10 and stores the module in the storage unit 302. The control unit 306 then executes the group of execution instructions making up the module and controls the individual function unit 305 in accordance with the content of the execution instructions (see steps S905 and S906 of FIG. 9). Accordingly, the individual functions are added to the functions performable by the individual function unit 305.

The control unit 306 performs a registration request function of receiving a user instruction from the input unit 303 making a request to register the household appliance with the server 10 and transmitting a registration request that includes the device ID of the household appliance to the server 10.

1-4. Router 20

The router 10 is a device enabling different networks to communicate with each other. As depicted in FIG. 1, in the function update system 1, the router 20 connects a network outside the home, to which the server 10 belongs, to a network inside the home, to which the household appliances 30-1 through 30-5 belong. In the following explanations, all communication between the server 10 and any of the household appliances 30-1 through 30-5 is assumed to be performed via the router 20, even when not specifically described as such.

1-5. Operations 1-5-1. Function Addition Process

Figure 8:
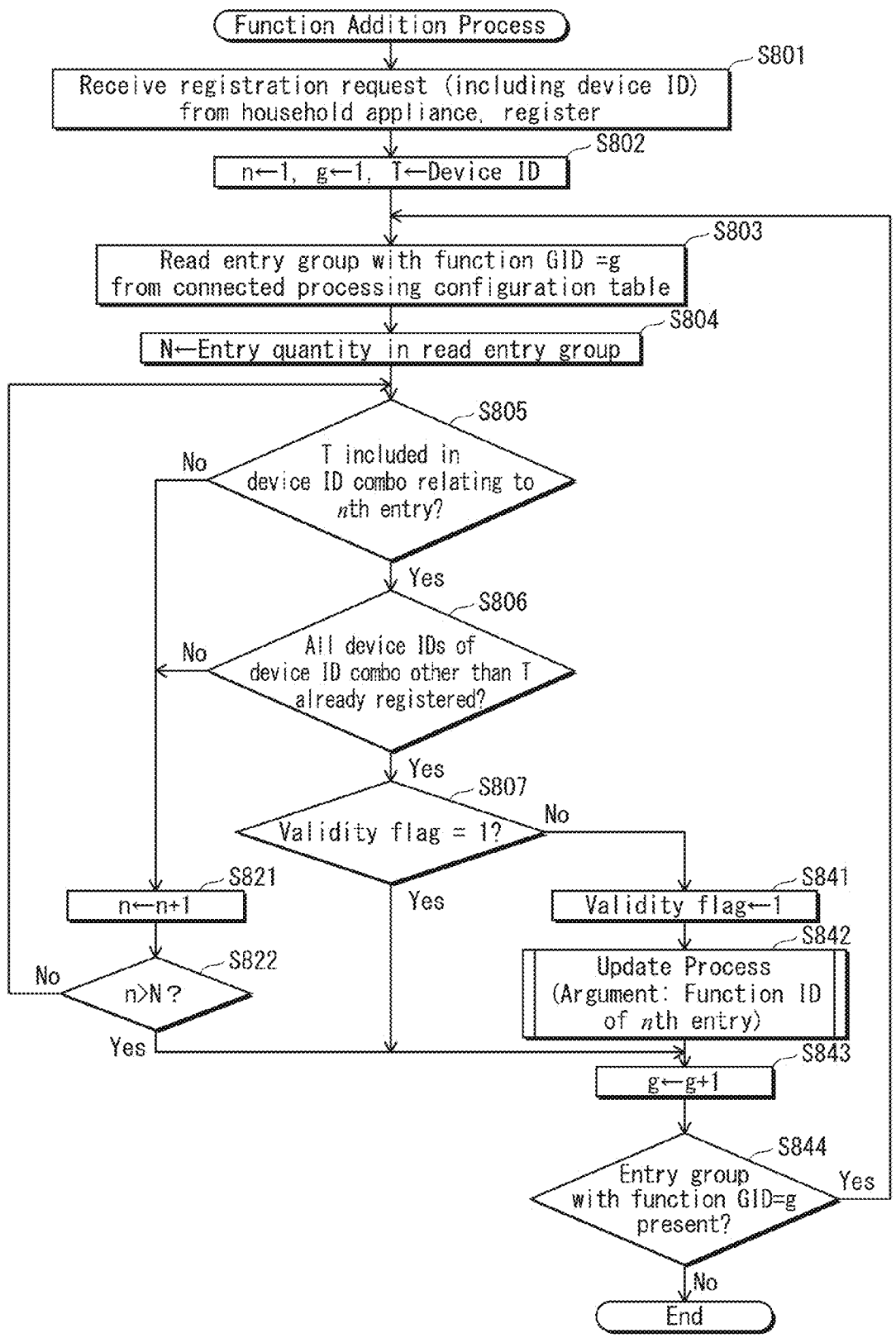
FIG. 8 depicts an example of function addition pertaining to Embodiment 1 of the present disclosure.

The function addition process by the server 10 and the household appliances is described below, with reference to FIG. 8.

In step S801, the control unit 205 of the server 10 receives a registration request transmitted by a household appliance having a device ID that is not registered in the device registration table.

The control unit 205 determines whether or not the device ID in the received registration request is registered in the device registration table and, when the device ID in the received registration request is not registered in the device registration table, performs registration.

For example, given the device registration table depicted in FIG. 4 and a device ID of 4 in the registration request, the value of 4 for the device is found not to be registered in the device registration table. Thus, in step S801, the control unit 205 registers the value of 4 as the device ID in the device registration table.

In step S802, the control unit 205 initializes the variables (i.e., n, g, and T) used in the function addition process. The control unit 205 sets variable n to a value of 1. Here, n is used to distinguish among entries in the entry group subject to processing.

The control unit 205 also sets variable g to a value of 1. Here, g represents the entry group subject to processing.

The control unit 205 also sets variable T to the device ID in the device registration request received in step S801. For example, given the device ID of 4 received in step S801, the control unit 205 sets variable T to 4.

In step S803, the control unit 205 reads the entry group having the function GID of g from the cooperative processing configuration table. For example, entry group 531 is read when g has a value of 1.

In step S804, the control unit 205 sets variable N to the entry quantity of the entry group read in step S803.

For example, given the entry group with the function GID of 1, the entry quantity in the entry group is two. Thus, N is set to 2.

In step S805, the control unit 205 determines whether or not the device ID combination of the nth entry in the entry group read in step S803 includes the value of T. In the affirmative case (YES in step S805), the process advances to step S806. In the negative case (NO in step S805), the process advances to step S821.

For example, with n set to 1 and the device ID of 4, the device ID combination of entry 511, which is first in entry group 531, includes a value of 4. Here, the result of step S805 is YES.

In step S806, the control unit 205 determines whether or not all device IDs in the device ID combination of the nth entry other than T are already registered in the device registration table. In the affirmative case (YES in step S806), the process advances to step S807. In the negative case (NO in step S806), the process advances to step S821.

For example, with entry 511 as the nth entry, T=4, and values 1, 2, and 3 being written as device IDs in the device registration table, the determination result is affirmative.

In step S807, the control unit 205 determines whether nor not the validity flag in the nth entry is set to a value of 1. In the affirmative case (YES in step S807), the process advances to step S843. In the negative case (NO in step S807), the process advances to step S841.

In step S841, the control unit 205 sets the validity flag in the nth entry to a value of 1.

In step S842, the control unit 205 performs an update process. The details of the update process are given in FIG. 9. The update process uses the function ID of the nth entry (the argument mentioned in step S842 of FIG. 8). The details are discussed with reference to FIG. 9. As a result of the update process, the functions necessary for executing cooperative processing are added to the household appliances.

In step S843, the control unit 205 increments the value of g by one.

In step S844, the control unit 205 determines whether or not an entry group with a function GID of g is listed in the cooperative processing configuration table. In the affirmative case (YES in step S844), the process advances to step S803. In the negative case (NO in step S844), the process ends (END).

In step S821, the control unit 205 also increments the value of n by one. Then, in step S822, the control unit 205 determines whether or not n is greater than N. In the affirmative case (YES in step S822), the process advances to step S843. In the negative case (NO in step S822), the process advances to step S805.

1-5-2. Update Process

Figure 9:
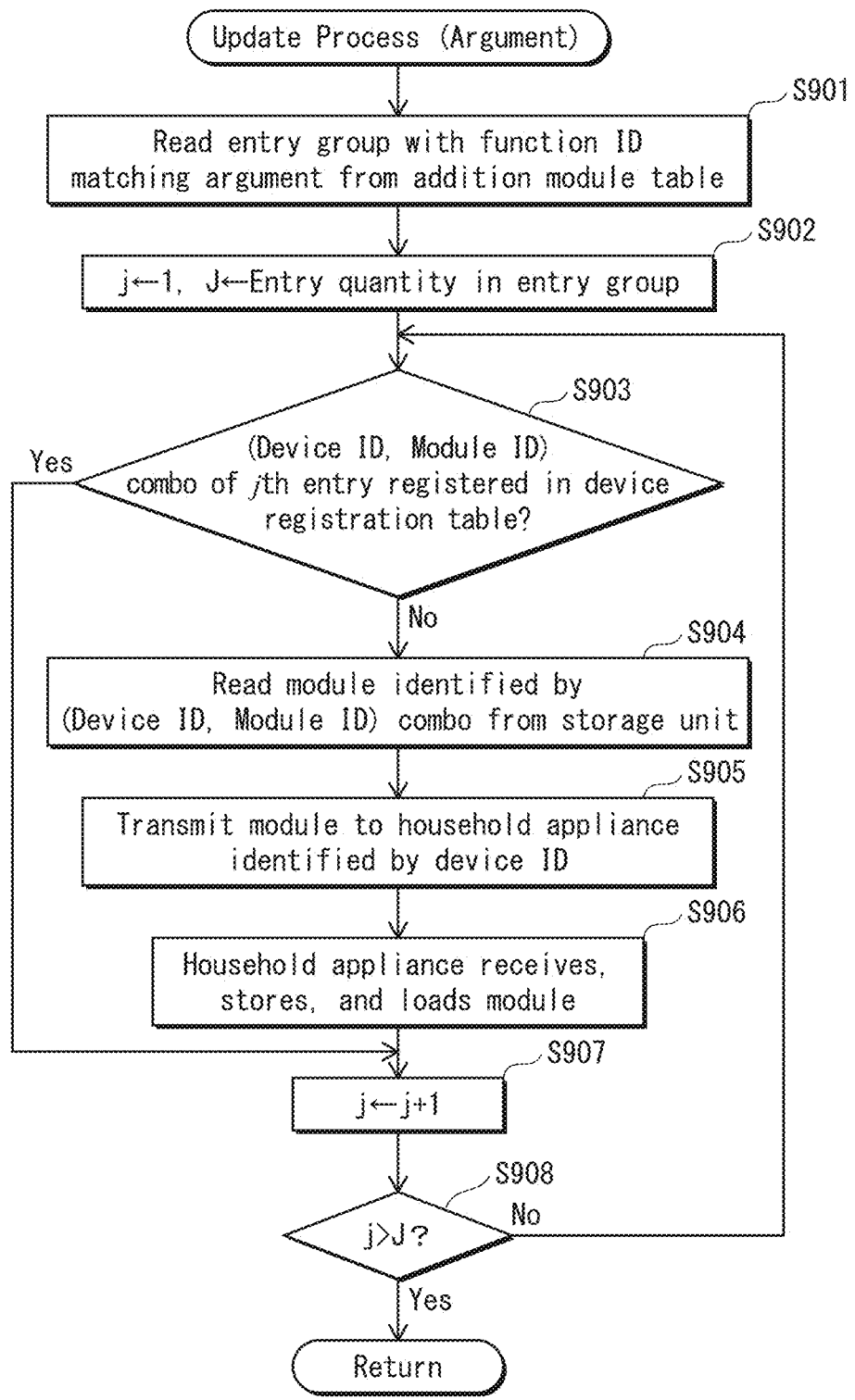
FIG. 9 is a flowchart representing an update process pertaining to Embodiment 1 of the present disclosure.

The details of step S842, namely the update process, are described below with reference to FIG. 9.

The function ID of the function subject to the update process is the function ID of the nth entry (i.e., the argument) described in the above discussion of step S842.

In step S901, the control unit 205 reads a group of entries from the addition module table for which the function ID matches the function ID of the argument.

For example, given the argument indicating a function ID of A001, entry group 631 is read.

In step S902, the control unit 205 initializes the variables (i.e., j and J) used in the process.

The control unit 205 sets variable j to a value of 1. Here, j is a variable used to specify an entry subject to processing within the entry group subject to processing in the addition module table.

The control unit 205 also sets variable J to the entry quantity of the entry group read in step S901.

For example, given that entry group 631 is subject to processing, and that entry group 631 has an entry quantity of 4, then J is set to 4.

In step S903, the control unit 205 determines whether a pair of a device ID and a module ID in the jth entry of the entry group read in step S901 are already registered in the device registration table. In the affirmative case (YES in step S903), the process advances to step S907. In the negative case (NO in step S903), the process advances to step S904.

For example, given the device registration table depicted in FIG. 4, entry 611, which is first in entry group 631, indicates a pair of a device ID (having a value of 1) and a module ID (having a value of M11) that are already registered in the device registration table of FIG. 4. Thus, the determination result is negative (NO in step S903).

In step S904, the control unit 205 reads the module identified by the pair (i.e., the device ID and the module ID) used in the determination of step S903 from the storage unit 202.

For example, when the module information stored in the storage unit 202 is as depicted in FIG. 7, then given the pair (i.e., the device ID and the module ID) used in the determination of step S903 having the respective values of 4 and M41, then module 41 is read.

In step S905, the control unit 205 transmits the module read in step S904 to the household appliance identified by the device ID used in the determination of step S903.

In step S906, the household appliance receiving the module transmitted in step S905 stores the received module in the storage unit 302, loads the received module into memory, and then causes the processor therein to execute the received module. Thus, the new function is added to the household appliance.

In step S907, the control unit 205 increments the value of j by one.

In step S908, the control unit 205 determines whether or not the value of j is greater than the value of J. In the affirmative case (YES in step S908), the process ends (RETURN). In the negative case (NO in step S908), the process advances to step S903.

1-5-3. Lighting Adjustment Process

The lighting adjustment process is described below with reference to FIG. 10. The lighting adjustment process is performed when the functions pertaining to the lighting adjustment control function have been updated in the household appliances, or in other words, when the validity flag of entry 512 in the cooperative processing configuration table is set to 1.

In step S1001, the individual function unit 305 of the first household appliance 30-1 transmits a brightness notification indicating the current brightness to the server 10, using the brightness notification function added by receiving module 11. The processing of step S1001 is executed every time the first household appliance 30-1 performs a change in brightness in accordance with a user instruction. The control unit 205 of the server 10 receives the brightness notification and stores the current brightness of the first household appliance 30-1.

In step S1002, the control unit 306 of the third household appliance 30-6 receives a user instruction, input by the user using the input unit 203, requesting playback of a disc. The control unit 306 outputs a request to acquire the genre of a video recorded on the inserted disc to the individual function unit 305. Here, the individual function unit 305 of the third household appliance 30-3 acquires the genre of the video recorded on the inserted disc.

In step S1003, the individual function unit 305 of the third household appliance 30-3 makes a genre notification indicating the genre acquired in step S1002 to the server 10, using the genre notification function added by receiving module 31. The control unit 205 of the server 10 receives and stores the genre notification.

In step S1004, the control unit 205 of the server 10 determines whether or not the genre indicated in the genre notification is a movie. In the affirmative case (YES in step S1004), the process advances to step S1005. In the negative case (NO in step S1004), the process advances to step S1007.

In step S1005, the control unit 205 of the server 10 determines whether or not the brightness of the first household appliance 30-1 stored in step S1001 is equal to or greater than a predetermined threshold. In the affirmative case (YES in step S1005), the process advances to step S1006 and then to step S1007. In the negative case (NO in step S1005), the process advances to step S1007.

In step S1006, the control unit 205 of the server 10 transmits a brightness decrease instruction, which is a type of brightness change instruction for decreasing the brightness, to the first household appliance 30-1. The control unit 306 of the first household appliance 30-1 receives the brightness decrease instruction.

In step S1031, the control unit 306 of the first household appliance 30-1 outputs a brightness decrease instruction to the individual function unit 305 in response to the brightness decrease instruction received in step S1006. The individual function unit 305 decreases the brightness in response to the brightness decrease instruction, using the external brightness control function added by receiving module 11. The brightness is decreased until a brightness suitable for movie viewing by the user is reached, that brightness having been set in advance.

In step S1007, the server 10 transmits a disc playback instruction to the third household appliance 30-3. The control unit 306 of the third household appliance 30-3 receives the disc playback instruction.

In step S1021, the control unit 306 of the third household appliance 30-3 outputs a disc playback instruction to the individual function unit 305 in response to the received disc playback instruction. The individual function unit 305 of the third household appliance 30-3 begins to play back the disc using the external playback control function added by receiving module 31.

1-5-4. Fax Viewing Support Process

The fax viewing support process is described below, with reference to FIG. 11. The fax viewing support process is performed when the functions pertaining to the fax viewing support function have been updated in the household appliances, or in other words, when the validity flag of entry 511 in the cooperative processing configuration table is set to 1. Also, the fax viewing support process assumes that the above-described lighting adjustment processing has been performed and that the user is viewing a movie with the lighting at low brightness.

In step S1101, the individual function unit 305 of the fourth household appliance 30-4 receives a fax. Step S1101 is a trigger for starting the fax viewing support processing.

In step S1102, the individual function unit 305 of the fourth household appliance 30-4 transmits a fax reception notification to the server 10, using the fax reception notification function added by receiving module 41. The control unit 205 of the server 10 receives the fax reception notification.

In step S1111, the control unit 205 of the server 10 determines whether or not the brightness in the notification made by the first household appliance 30-1 during the lighting adjustment process is equal to or less than a predetermined threshold. In the affirmative case (YES in step S1111), the process advances to step S1112 and then to step S1113. In the negative case (NO in step S1111), the process advances to step S1113.

In step S1112, the control unit 205 of the server 10 transmits a brightness increase instruction, which is a type of brightness change instruction for increasing the brightness, to the first household appliance 30-1. The control unit 306 of the first household appliance 30-1 receives the brightness increase instruction.

In step S1151, the control unit 306 of the first household appliance 30-1 outputs a brightness increase instruction to the individual function unit 305 in response to the brightness increase instruction received in step S1112. The individual function unit 305 increases the brightness in response to the brightness increase instruction, using the external brightness control function added by receiving module 11. Here, the brightness is raised to a brightness appropriate for the user to view a fax, which has been set in advance.

In step S113, the control unit 205 of the server 10 transmits a playback pause instruction to the third household appliance 30-3. The control unit 306 of the third household appliance 30-3 receives the playback pause instruction.

In step S1131, the control unit 306 of the third household appliance 30-3 outputs a playback pause instruction to the individual function unit 305. The individual function unit 305 pauses playback of the BD using the external playback control function added by receiving module 31.

In step S1114, the control unit 205 of the server 10 transmits a fax reception OSD display instruction to the third household appliance 30-3. The control unit 306 of the third household appliance 30-3 receives the fax reception OSD display instruction.

In step S1132, the control unit 306 of the third household appliance 30-3 outputs a fax reception OSD display instruction to the individual function unit 305. The individual function unit 305 performs a fax reception OSD display using the fax reception OSD display function added by receiving module 32.

1-5-5. Temperature Adjustment Process

The temperature adjustment process is described below with reference to FIG. 12. The temperature adjustment process is performed when the functions pertaining to the temperature adjustment control function have been updated in the household appliances, or in other words, when the validity flag of at least one of entry 513 and entry 514 in the cooperative processing configuration table is set to 1.

In step S1201, the control unit 306 of the second household appliance 30-2 acquires a user instruction switching the power ON from the input unit 303. The control unit 306 of the second household appliance 30-2 controls the power of the household appliance to switch from a standby state to an ON state. Then, the control unit 306 of the second household appliance 30-2 transmits a power ON notification indicating that the power ON process has been performed to the server 10. The control unit 205 of the server 10 receives the power ON notification transmitted by the second household appliance 30-2.

In step S1231, the server 10 transmits a wind flow increase instruction to the fifth household appliance 305. The control unit 306 of the fifth household appliance 30-5 receives the wind flow increase instruction.

In step S1251, the control unit 306 of the fifth household appliance 30-5 outputs a flow rate increase instruction to the individual function unit 305 in response to the wind flow increase instruction received in step S1231. The individual function unit 305 of the fifth household appliance 30-5 increases the output wind flow by using the external wind flow control function added by receiving module 51. The wind flow increased by the individual function unit 305 is sufficient to prevent a raise in temperature above a normal temperature, which may occur when at least one of the second household appliance 30-2 and the third household appliance 30-3 is in a power ON state. This wind flow is set in advance and described within module 51.

In step S1211, the control unit 306 of the third household appliance 30-3 acquires a user instruction switching the power ON from the input unit 303. The control unit 306 of the third household appliance 30-3 controls the power of the household appliance to switch from a standby state to an ON state. Then, the control unit 306 of the third household appliance 30-3 transmits a power ON notification indicating that the power ON process has been performed to the server 10. The control unit 205 of the server 10 receives the power ON notification transmitted by the third household appliance 30-3.

In step S1232, the server 10 transmits a wind flow increase instruction to the fifth household appliance 305. The control unit 306 of the fifth household appliance 30-5 receives the wind flow increase instruction.

In step S1252, the control unit 306 of the fifth household appliance 30-5 outputs a flow rate increase instruction to the individual function unit 305 in response to the wind flow increase instruction received in step S1232. The individual function unit 305 of the fifth household appliance 30-5 increases the output wind flow by using the external wind flow control function added by receiving module 51.

Also, in step S1212, the control unit 306 of the third household appliance performs a process of switching the household appliance from the power ON state to the standby state once a user instruction to switch the power OFF is acquired by the input unit 303. Then, the control unit 306 of the third household appliance 30-3 transmits a power OFF notification indicating that the power OFF process has been performed to the server 10. The control unit 205 of the server 10 receives the power OFF notification transmitted by the third household appliance 30-3.

In step S1233, the server 10 transmits a wind flow decrease instruction to the fifth household appliance 305. The control unit 306 of the fifth household appliance 30-5 receives the wind flow decrease instruction.

In step S1253, the control unit 306 of the fifth household appliance 30-5 outputs a flow rate decrease instruction to the individual function unit 305 in response to the wind flow decrease instruction received in step S1233. The individual function unit 305 of the fifth household appliance 30-5 decreases the output wind flow by using the external wind flow control function added by receiving module 51. The wind flow increased by the individual function unit 305 is sufficient to prevent a drop in temperature below a normal temperature, which may occur when at least one of the second household appliance 30-2 and the third household appliance 30-3 is switched from a power ON state to a standby state. This wind flow is set in advance and described within module 51.

2. Embodiment 2

2-1. Overview

In Embodiment 1, new functions are added to the household appliances when a household appliance newly purchased by the user is added to household appliance originally present in the home, in order to have all the household appliances perform cooperative processing. However, performing the cooperative processing in response to the combination of household appliances is sufficient. New functions need not necessarily be added. For example, cooperative processing may be executing by changing the operations of the household appliances. In Embodiment 2, the cooperative processing is performed by changing a menu configuration displayed by the household appliances before and after the addition of a new household appliance.

A function update system 1a pertaining to Embodiment 2 is described below, with reference to the drawings. Here, components identical to those described in Embodiment 1 use common reference signs, and explanations thereof are omitted unless particularly necessary.

Figure 13:
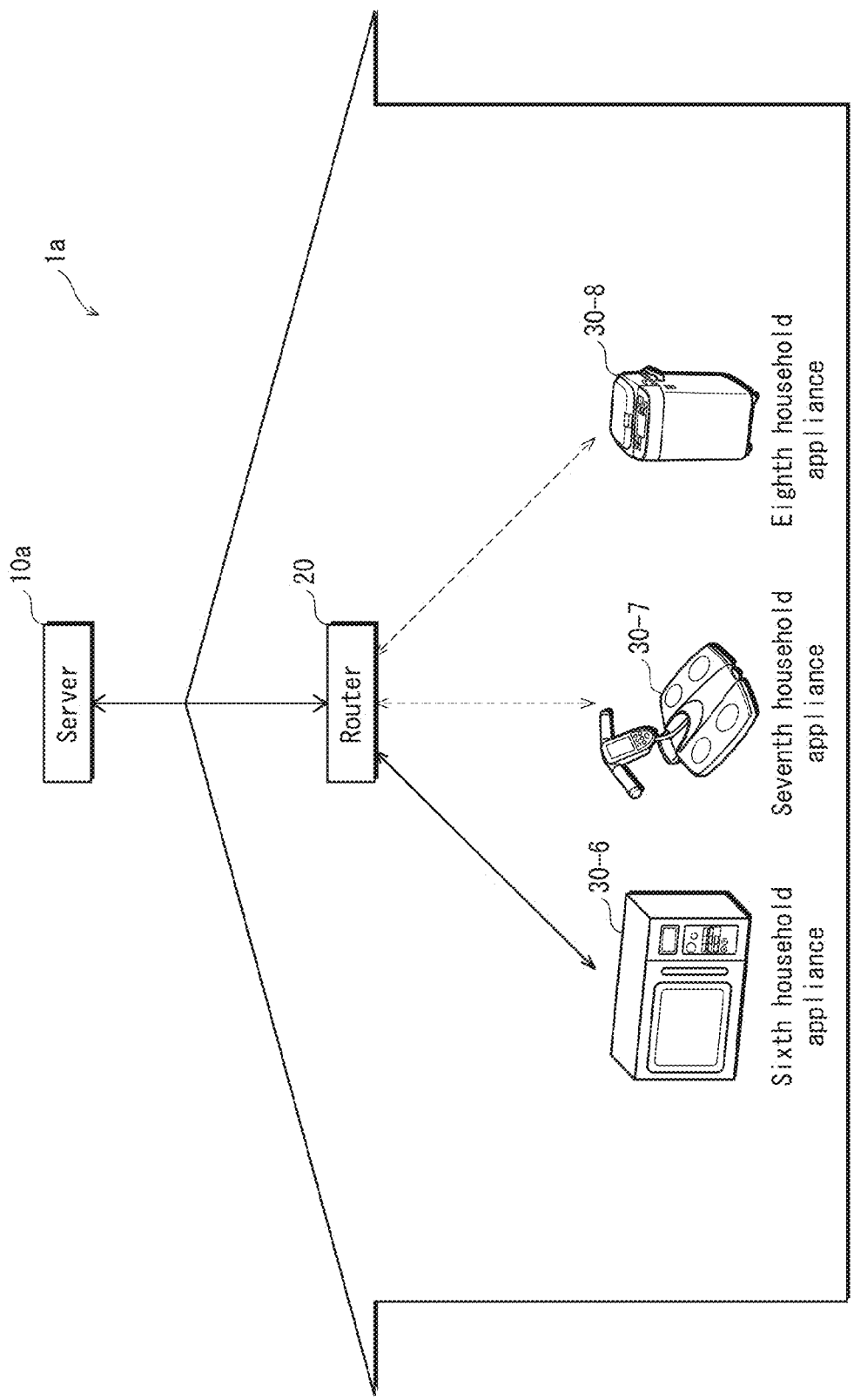
FIG. 13 depicts the configuration of a function update system pertaining to Embodiment 2 of the present disclosure.

As depicted in FIG. 13, the function update system 1a includes a server 10a, the router 20, and household appliances denoted a sixth household appliance 30-6, a seventh household appliance 30-7, and an eighth household appliance 30-8. Specifically, the sixth household appliance 30-6 is a microwave oven, the seventh household appliance 30-7 is a body composition meter, and the eighth household appliance 30-8 is a bread maker. Among the sixth household appliance 30-6, the seventh household appliance 30-7, and the eighth household appliance 30-8, the sixth household appliance 30-6 is originally installed in the home, while the seventh household appliance 30-7 and the eighth household appliance 30-8 are newly purchased by the user and added to the home.

2-2. Server 10a

The server 10a is a device for performing cooperative processing by controlling the household appliances in the home (i.e., the household appliances 30-6 through 30-8). The server 10a is realized as a computer having largely identical components to the server 10.

(1) Storage Unit 202

As in Embodiment 1, the storage unit 202 stores the device registration table, the cooperative processing configuration table, the addition module table, and the module information as data. The explanations for the data are largely similar to those given in Embodiment 1. However, in Embodiment 2, the entries depicted in FIG. 14 are added to the cooperative processing configuration table, the entries depicted in FIG. 15 are added to the addition module table, and the entries depicted in FIG. 16 are added to the module information.

(2) Control Unit 205

As in Embodiment 1, the main functions of the control unit 205 are device registration, function addition, and cooperative processing control. The control unit 205 also operates a web server.

2-3. Household Appliances 30-6 Through 30-8

The functional configurations of the sixth household appliance 30-6, the seventh household appliance 30-7, and the eighth household appliance 30-8 are each largely similar to that described in Embodiment 1 for the first household appliance 30-1. However, the functions of the individual function unit 305 differ for each of the household appliances, as in Embodiment 1. The household appliances are individually described below.

(1) Sixth Household Appliance 30-6

The sixth household appliance 30-6 is a microwave oven as described above. The individual function unit 305 thereof performs individual functions of material steaming, steam cooking, cooking, warming, and other typical microwave oven functions. Another function involves displaying a menu in accordance with menu information.

In addition, a calorie information upload function is added as an individual function upon receiving module 61 from the server 10a. Further, upon receiving module 62 from the server 10a, a menu configuration and menu image are changed and a cooking method described by the changed menu is added as an individual function.

(2) Seventh Household Appliance 30-7

The seventh household appliance 30-7 is a body composition meter, as described above. The individual function unit 305 thereof performs individual functions of measuring the body weight of the user, measuring the body fat percentage, and other typical body composition meter functions.

In addition, a body composition information upload function is added as an individual function upon receiving module 71 from the server 10a.

(3) Eighth Household Appliance 30-8

The eighth household appliance 30-8 is a bread maker, as described above. The individual function unit 305 thereof performs individual functions of making bread dough, making noodle and pasta dough, cooking bread dough, and other typical bread maker functions. The eighth household appliance 30-8 also has a pizza dough making function.

2-4. Data Configuration

In Embodiment 2, the modules transmitted to the household appliances are different from those of Embodiment 1. These modules are described below.

(1) Module 61

Module 61 is a group of execution instructions interpreted by a computer of the sixth household appliance 30-6. The sixth household appliance 30-6 is operated in accordance with the execution instructions making up module 61, thereby performing the function of calorie information upload.

The calorie information upload involves transmitting calorie information to the server 10 that indicates calories in each meal produced in accordance with the cooking method described in the menu image displayed by the household appliance. The calorie information indicated for each meal is stored in a database that is stored in advance in the storage unit 302 of the sixth household appliance 30-6.

(2) Module 62

Module 62 is a group of execution instructions interpreted by a computer of the sixth household appliance 30-6, and includes menu information for updating menu information of a previously stored menu in the sixth household appliance 30-6 (hereinafter termed menu update information).

The sixth household appliance 30-6 updates the configuration of the menu by replacing the previously stored menu information with the menu update information. The sixth household appliance 30-6 also performs cooking using a cooking method described in the updated menu image, through operation in accordance with the execution instructions of module 62.

The menu information is specifically described below with reference to FIGS. 21 and 22.

Figure 21:
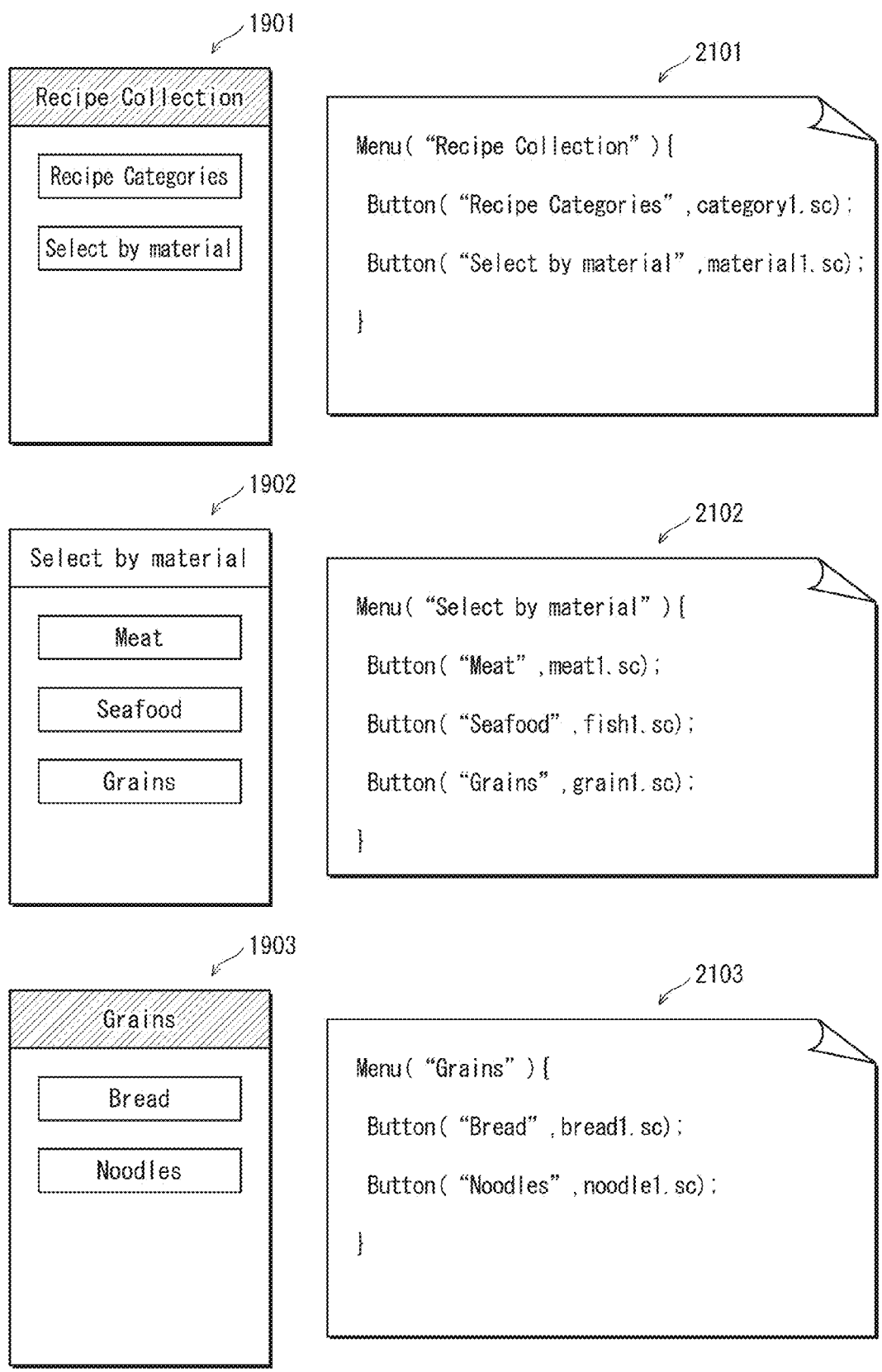
FIG. 21 depicts an example of menu information corresponding to a menu image, pertaining to Embodiment 2 of the present disclosure.
Figure 22:
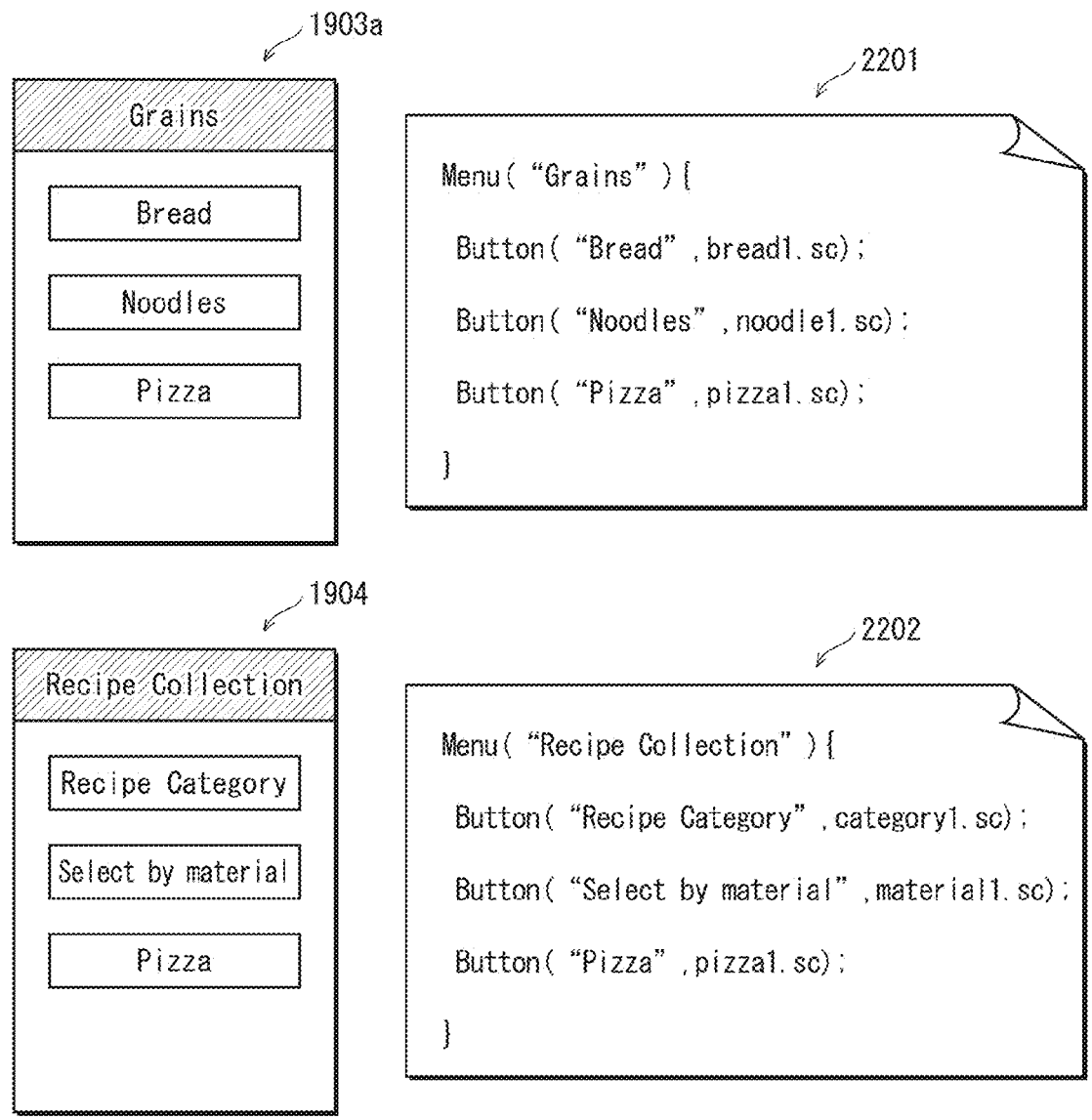
FIG. 22 depicts an example of menu information corresponding to a menu image, pertaining to Embodiment 2 of the present disclosure.

FIG. 21 depicts a menu image and the menu information corresponding to the menu image. The menu information is written in a mark-up language.

Here, menu information 2101, 2102, and 2103 are pieces of menu information stored in the sixth household appliance 30-6 in advance, and respectively represent menu images 1901, 1902, and 1903.

In the menu information, the line "Menu("XXX")" describes the title XXX displayed in the menu image.

Likewise, the line "Button("YYY", zzz)" describes the title of the button YYY displayed in the menu image and menu information zzz displayed instead of the current menu information when the user selects that button.

For example, for menu image 1901 of the sixth household appliance 30-6, which has the title "Recipe Collection", a user selection of the button having the title "Fun with Cooking" causes menu image 1901 to be replaced with menu image 1902, represented by menu information (material1.sc).

Also, menu information 2201 and menu information 2202 are menu update information. Module 62 replaces menu information 2201 with menu information 2103 in storage, while menu information 2202 remains stored as-is.

Upon receiving module 62, as described above, the sixth household appliance 30-6 overwrites menu information 2103 with menu information 2201 in storage, while menu information remains stored as-is. The above-described menu information update updates the menu configuration from the configuration depicted in FIG. 19 to the configuration depicted in FIG. 20.

(3) Module 71

Module 71 is a group of execution instructions interpreted by a computer of the seventh household appliance 30-7. The seventh household appliance 30-7 is operated in accordance with the execution instructions making up module 71, thereby performing the function of body composition information upload.

The body composition information upload function involves transmitting body composition information to the server 10a every time the user measures body composition information using the household appliance.

2-5. Cooperative Processing

The cooperative processing of Embodiment 2 is described below. As an example of the cooperative processing, the household appliances in the home execute a measured data upload process and a pizza creation process.

(1) Measured Data Upload Process

The measured data upload process is executable when the seventh household appliance 30-7 is added to the home in which the sixth household appliance 30-6 is already present. The measured data upload process involves uploading data measured by the household appliances to the server 10a. In the measured data upload process, the sixth household appliance 30-6 transmits calorie information to the server 10a, the calorie information indicating calories in each meal produced in accordance with the cooking method described in the menu image displayed by the household appliance. Also, the seventh household appliance 30-7 transmits body composition information to the server 10a each time the user measures body composition information using the household appliance. The body composition information includes body weight and body fat percentage information.

The server 10a receives the calorie information and the body composition information and stores this information as personal health data, as depicted in FIG. 17. The personal health data indicates a date, which represents the date of reception for the calorie information and the body composition information, the calories, the weight, and the body fat percentage, stored in association.

Via the web server, the server 10a publishes the personal health data in a format that only the user of the household appliances transmitting the calorie information and the body composition information is able to read by using a browser.

The user operates the browser through an information device such as a separate computer, a smartphone, or the like, and views the published personal health data as a display on the information device made by the browser. FIG. 18 depicts an example of a screen for the personal health data as displayed by the browser. The user is able to find useful information about their own health by checking for changes in calories, weight, and body fat percentage.

(2) Pizza Creation Process

The pizza creation process is a process of creating a pizza by having both household appliances execute a process intended to create a pizza in accordance with a menu image displayed by the sixth household appliance 30-6. The pizza creation process is executable when the eighth household appliance 30-8 is added to the home in which the sixth household appliance 30-6 is already present. More specifically, once the eighth household appliance 30-8 is added to the home, the menu image displayed by the sixth household appliance 30-6 is updated to add a button image and a menu image relating to a pizza dough creation function of the eighth household appliance 30-8. The added menu image indicates a method for creating pizza using the pizza dough created by the eighth household appliance 30-8. The user operates the sixth household appliance 30-6 in accordance with the method indicated by the menu image, thereby appropriately cooking the pizza dough created with the eighth household appliance 30-8 in the sixth household appliance 30-6.

The menu configuration displayed by the sixth household appliance 30-6 before and after the eighth household appliance 30-8 is added to the home is described below.

Figure 19:
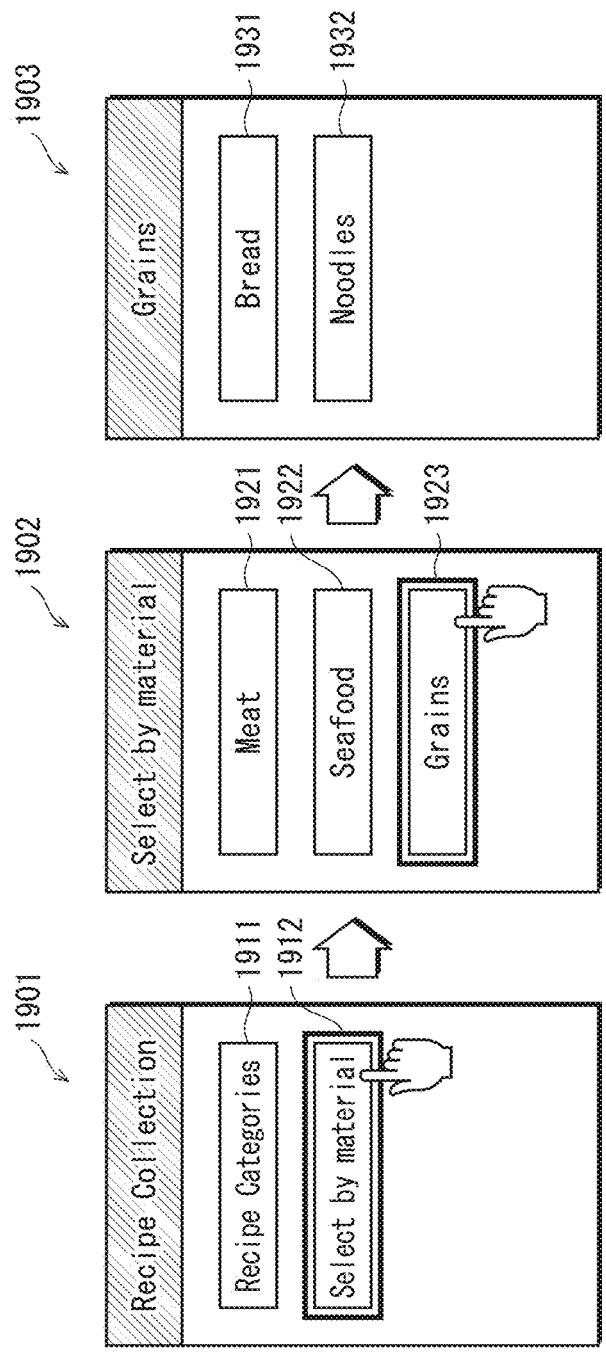
FIG. 19 represents a menu configuration before an update, pertaining to Embodiment 2 of the present disclosure.

FIG. 19 depicts the menu configuration displayed on the display unit 304 of the sixth household appliance 30-6 before the addition of the eighth household appliance 30-8 to the home. The menu displayed by the sixth household appliance 30-6 has a hierarchical structure.

The first image displayed by the display unit 304 of the sixth household appliance 30-6 (the top level of the hierarchy) is menu image 1901, indicating a recipe collection.

This menu image 1901 includes button images 1911 and 1912. The user is able to select either one of the button images 1911 and 1912 by using the input unit 303. Once one of the button images 1911 and 1912 has been selected by the user, the sixth household appliance 30-6 displays a lower-level menu image corresponding to the selected button image on the display unit 304. For example, when the user has selected button image 1912, the sixth household appliance 30-6 displays menu image 1902 on the display unit 304.

Menu image 1902 includes button images 1921, 1922, and 1923, as indicated in FIG. 19. Once the user selects any one of button images 1921, 1922, and 1923, the sixth household appliance 30-6 displays a yet lower-level menu image (e.g., menu image 1903) corresponding the selected button image on the display unit 304.

Menu image 1903 includes button images 1931 and 1932, as indicated in FIG. 19.

Figure 20:
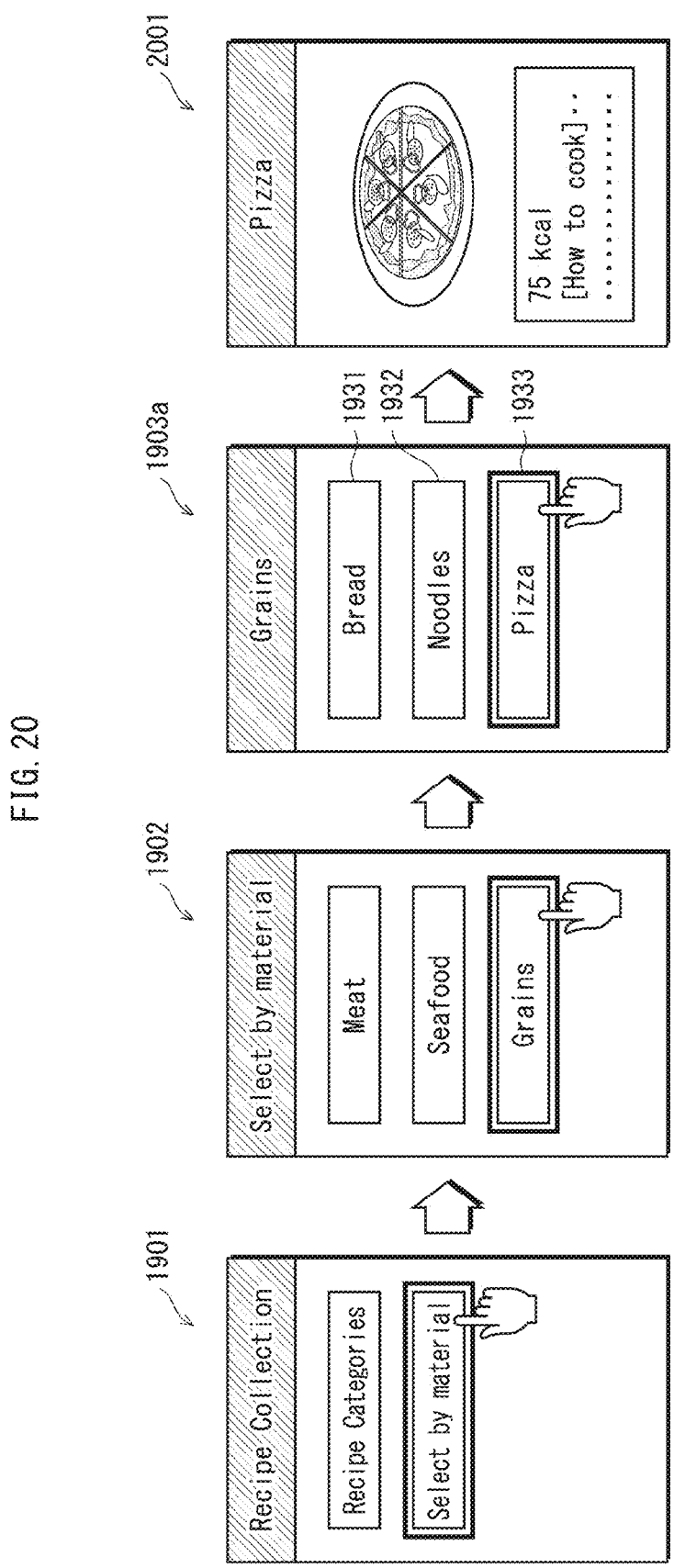
FIG. 20 represents a menu configuration after an update, pertaining to Embodiment 2 of the present disclosure.

FIG. 20 depicts the menu configuration displayed on the display unit 304 of the sixth household appliance 30-6 after the addition of the eighth household appliance 30-8 to the home.

Menu images 1901 and 1902 are identical to those depicted in FIG. 19. Menu image 1903a differs from menu image 1903 in the addition of button image 1933, displaying pizza. When the user has selected button image 1933, the sixth household appliance 30-6 displays menu image 2001 on the display unit 304.

When creating a pizza with the sixth household appliance 30-6 and the eighth household appliance 30-8, a process of manually transferring the pizza dough created by the eighth household appliance 30-8 to the sixth household appliance 30-6 is initiated. However, the pizza dough creation process by the eighth household appliance 30-8 involves cooking the pizza by having the sixth household appliance 30-6 cook the pizza dough. As such, this process fits the broad definition of cooperative processing. The change to the menu configuration is thus equivalent to the necessary update of the household appliances in order to perform the cooperative processing.

3. Variations

Although the function update system pertaining to the present disclosure has been described above in terms of the Embodiments, the following variations are also applicable to the provided examples of the function update system. Needless to say, no limitation to the function update system of the present disclosure to the above-described Embodiments is intended.

(1) In the above-described Embodiments, when adding functions to the household appliances, the server 10 transmits modules for performing the added function to the respective household appliances. However, simply adding the functions is sufficient. For example, instead of module units, the entire control program of each household appliance may be updated with a new control program that includes a group of execution instructions for performing the added functions.

FIG. 23 depicts a program version table indicating, in association, a household appliance device ID, a control program version of the household appliance, the actual control program, and a function ID of functions in the control program. This signifies that each row (entry) in the program version table corresponds to the household appliance identified by the device ID, and that adding the function identified by the function ID is accomplished by transmitting the program identified by the version entry.

For example, entry 2301 lists a function ID (3), a version (v101), a program (program P301), and function IDs (A001 and A003), in association.

When adding a function in accordance with entry 2301, the server 10 transmits program P301, which has the version of v101, to the third household appliance 30-3, which has the device ID of 3, in order to add the functions having the respective function IDs of A001 and A003.

(2) In the above-described Embodiments, when adding functions to the household appliances, the server 10 transmits modules for performing the added function to the household appliances. However, simply adding the functions is sufficient. For example, a program for performing functions requiring an update may be stored in the household appliances in advance, that program being inactive. The server 10 need only transmit a signal making an instruction to activate the inactive program, rather than transmitting a module. Here, the household appliance receiving the signal making the activation instruction adds the function required for the cooperative processing by activating the inactive program.

(3) In Embodiment 2, the function addition to the sixth household appliance 30-6 once the eighth household appliance 30-8 has been newly added to the home is performed, as indicated in FIG. 20, by adding a button image 1933 and a menu image 2001 relating to the pizza dough creation function of the eighth household appliance 30-8 to the menu image displayed by the sixth household appliance 30-6. No such limitation is intended. The menu configuration of the sixth household appliance 30-6 may be changed in accordance with the functions of the eighth household appliance 30-8.

For example, the menu configuration of the sixth household appliance 30-6 may originally be as depicted in FIG. 20 rather than as in FIG. 19. In the configuration depicted in FIG. 20, displaying menu image 2001, relating to the pizza dough creation function of the eighth household appliance 30-8, requires that the user reach menu images 1902, 1903a, and 2001 from menu image 1901, which is top-most in the hierarchy.

Figure 24:
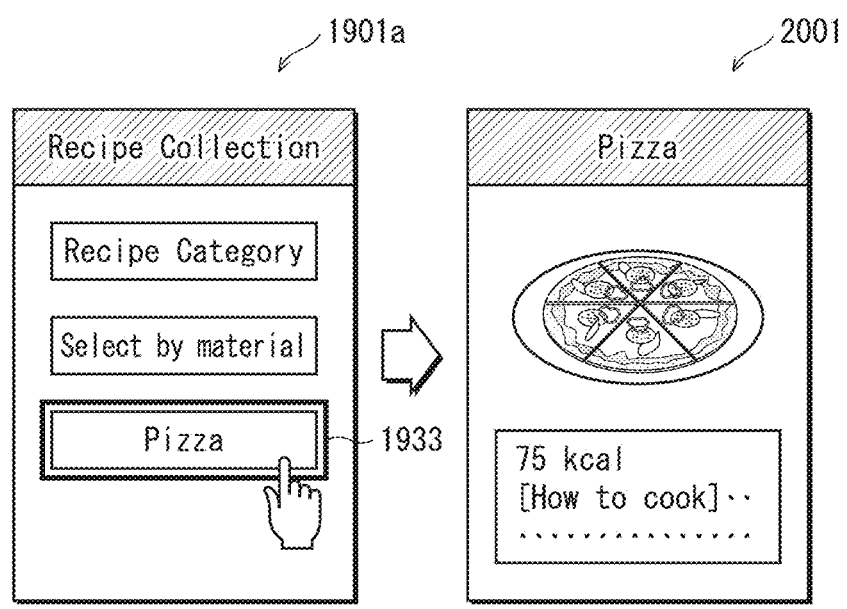
FIG. 24 represents a configuration example of an updated menu, pertaining to a variation of the present disclosure.

In such a case, the menu configuration of the sixth household appliance 30-6 is changed to the menu configuration depicted in FIG. 24 once the eighth household appliance 30-8 has been newly added to the home. As depicted in FIG. 24, displaying menu image 2001, relating to the pizza dough creation function of the eighth household appliance 30-8, is accomplished by reaching menu image 2001 directly from menu image 1901a, which is top-most in the hierarchy. Accordingly, the user experiences increased user-friendliness in being more easily able to reach menu image 2001, pertaining to the cooperative processing of the pizza creation function.

(4) In the above-described Embodiments, the servers 10 and 10a are described as always updating the functions of the household appliances whenever one household appliance is added. However, updates may also be performed only when desired by the user.

Figure 25:
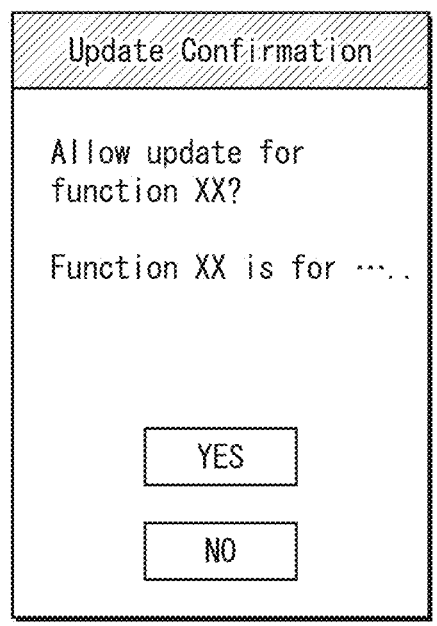
FIG. 25 represents an example of an image displayed for a user selection of whether or not to allow an update, pertaining to a variation of the present disclosure.

For example, the server 10 may transmit a confirmation image prior to transmitting a module relating to an update to the functions of the household appliances. As depicted in FIG. 25, the confirmation image describes the function and is intended for the user to select whether or not to perform the function update.

The household appliances receive and display the confirmation image. Then, upon acquiring a user instruction through the input unit 303 indicating that a function update is allowed, the household appliances make a request to the server 10 for module transmission. Once the request for module transmission has been made, the server 10 transmits the module to the household appliance making the request.

(5) In the above-described Embodiments, no functions are deleted from the household appliances when a household appliance is removed from the home. However, functions may also be deleted in such circumstances.

Figure 26:
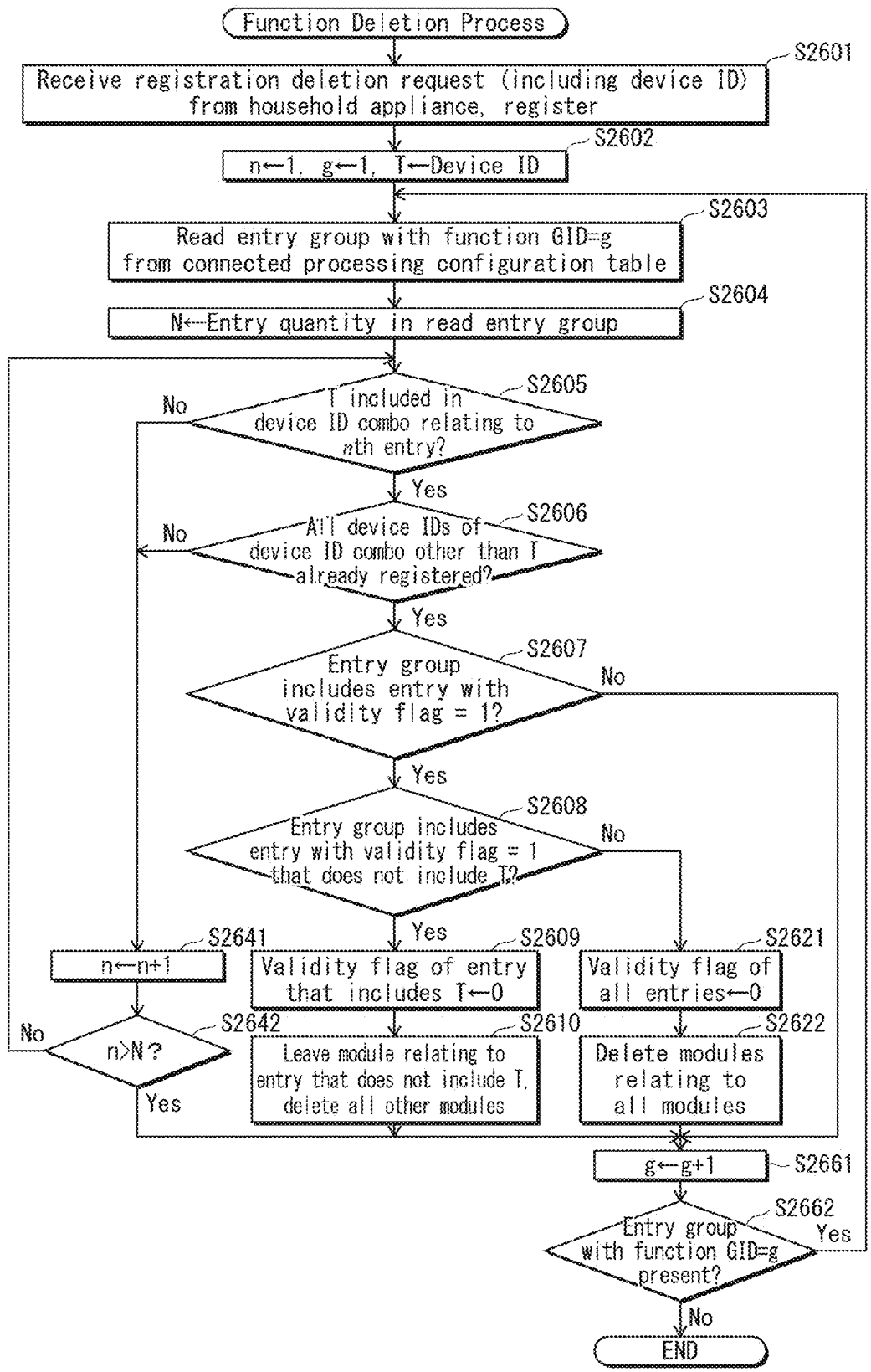
FIG. 26 is a flowchart representing a function deletion process pertaining to a variation of the present disclosure.

A function deletion process is described below with reference to FIG. 26.

In step S2601, the control unit 205 of the server 10 receives a registration deletion request transmitted by a household appliance having a device ID that is registered in the device registration table. The control unit 205 determines whether or not the device ID in the received registration deletion request is registered in the device registration table and, in the affirmative case, performs deletion.

In step S2602, the control unit 205 initializes the variables (i.e., n, g, and T) used in the device deletion process. This process is similar to the process of step S802.

The processing of steps S2603 through S2606, S2641, S2612, S2661, and S2662 is identical to the processing of steps S803 through S806, S821, S822, S843, and S844. Explanations of these steps are thus omitted.

In step S2608, the control unit 205 determines whether or not the entry group includes an entry having a validity flag and not including the value of T. In the affirmative case (YES in step S2608), the process advances to step S2609. In the negative case (NO in step S2608), the process advances to step S2621.

In step S2609, the control unit 205 sets the validity flag of all entries that include the value of T to zero.

In step S2610, the control unit 205 leaves modules pertaining to any entry that does not include the value of T, and transmits a deletion instruction designating the module ID of all other modules to each of the household appliances. The control unit 205 also deletes the module ID of the modules for which the deletion instruction is transmitted from the device registration table.

Upon receiving the deletion instruction, the household appliances each delete the module identified by the designated module ID.

In step S2621, the control unit 205 sets the validity flag of all entries to zero.

In step S2622, the control unit 205 transmits a deletion instruction designating the module ID of all modules pertaining to all entries to each of the household appliances. The control unit 205 also deletes the module ID of the modules for which the deletion instruction is transmitted from the device registration table.

Upon receiving the deletion instruction, the household appliances each delete the module identified by the designated module ID.

(6) In the above-described Embodiments, the household appliance are installed in a home. However, no limitation to the location is intended, provided that the servers 10 and 10a are able to realize communication.

(7) In the above-described Embodiments, the household appliances 30-1 through 30-8 are described as respectively being a ceiling light, a television, a BD player, a fax machine, an air conditioner, a microwave oven, a body composition meter, and a bread maker. However, no such limitation is intended, and the household appliance may be any appliance able to communicate with the server and execute control in accordance with control instructions transmitted by the server. Other possible household appliances include, for example, a smartphone, a rice cooker, a laundry machine, an audiovisual recording and playback device, a vacuum cleaner, an air purifier, a printer, an electric kettle, a coffee maker, a telephone, a portable telephone, an alarm clock, and so on. For all of these household appliances, the individual function unit 305 configuration performs the functions of that particular household appliance.

Also, in the above-described Embodiments, the cooperative processing is described as, for example, a lighting adjustment process, a fax viewing support process, a temperature adjustment process, a measured data upload process, and a pizza creation process. However, the cooperative processing may also be any group of processes executed by a plurality of the household appliances.

(8) In the above-described Embodiments, data, execution instructions, and so on are not transmitted and received among the household appliances. However, such transmission and reception may also be performed. Also, transmission and reception may not be performed directly among the household appliance but information required for the cooperative processing may be transmitted and received therebetween via the server.

(9) In the above-described Embodiments, the server is described as being realized as a single computer. However, any configuration enabling the performing of the functions described in the above Embodiments may be applied. For example, the server may be a cloud made up of one or more computers and storage devices.

(10) In the above-described Embodiments, the router 20 only performs relaying of communications between the household appliances and the server 10. However, the server 10 and the router 20 need not be clearly distinguished, and at least some functions of the server 10 may also be performed by the router 20.

(11) In the above-described Embodiments, the device registration function, the function addition function, the cooperative processing control function, the individual functions performed by the individual function units 305, the registration request function, and so on may each be a control program made up of program codes in a machine language or a high-level programming language for causing circuits connected to a processor of the server and of the household appliances to execute the functions, and may be recorded onto a recorded medium or distributed via communication channels. The recording medium may be any of an IC card, a hard disk, an optical disc, a floppy disc, ROM, flash memory, and so on. The control program delivered and distributed in this way is supplied for use by being stored in memory accessible by the processor, and the processor performs the functions described in the Embodiments by executing the control program. The processor may also compile or interpret the control program for execution.

(12) The various functional components of the above-described Embodiments (i.e., the communication unit 201, the storage unit 202, the input unit 203, the display unit 204, the control unit 205, the communication unit 301, the storage unit 302, the input unit 303, the display unit 304, the individual function unit 305, the control unit 306, and so on) may be realized as circuits executing the respective functions thereof, or may be realized by having one or more processors executing a program.

The functional components described above are typically realized by an LSI, which is a type of integrated circuit. These may be realized on individual chips, or a single chip may include a subset or the entirety of the components. Although LSI is mentioned, the terms IC, system LSI, super LSI, or ultra LSI may be used according to the degree of integration. Further, the integrated circuit method is not limited to LSI. A dedicate circuit or a general-purpose processor may also perform execution. After LSI manufacture, a field programmable gate array (FPGA) or reconfigurable processor may be used. Furthermore, developments and advances in semiconductor technology may lead to the appearance of an integrated circuit method that replaces LSI. Of course, such new technology may also be applied to integrating the functional blocks. Biotechnology applications are also possible.

(13) Portions of the above-described Embodiments and Variations may be freely combined.

4. Supplement

Further aspects of the function update system and function update method of the Embodiments are discussed below, along with variations and effects thereof.

(1) One aspect of the present disclosure is a function update method updating a function of a household appliance registered on a server, wherein the server stores: registration information listing identification information for each of a plurality of household appliances owned by a user; combination information listing a plurality of combinations, each combination including a plurality of household appliances performing cooperative processing; and update information for each household appliance included in each of the combinations, for updating a function for performing the cooperative processing, the function update method includes: receiving, from a given household appliance having identification information not listed in the registration information, a request to list the identification information for the given household appliance in the registration information, and listing the identification information for the given household appliance in the registration information; selecting a given combination among the combinations listed in the combination information, the given combination including the given household appliance and all other household appliances in the given combination being registered in the registration information; and transmitting update information to each household appliance requiring a function update in the given combination.

According to this configuration, cooperative processing is performable by improving the function in accordance with a given household appliance that is already registered in the registered information and another household appliance, despite the given household appliance not being provided in advance with a function for cooperative processing with the other household appliance.

(2) Also, each household appliance may include a processor and a storage unit storing a control program, and may be operated by the processor executing the control program, the update information may be an update control program that includes an execution instruction for a function requiring updating, and a household appliance receiving the update information may store the update information in the storage unit.

According to this configuration, the function for the cooperative processing may be provided to the household appliances in which the function for cooperative processing with the other household appliance is not provided in advance.

(3) Also, the update information may be received by a household appliance including a display, the household appliance receiving the update information having stored therein menu information defining menus forming a hierarchical structure and displaying the menus on the display in accordance with the menu information, and the update information may be menu information for updating that adds a menu related to the given household appliance to the menus.

According to this configuration, an appropriate display for performing the cooperative processing with the given household appliance may be added to the menu configuration displayed by the other household appliance.

(4) Also, the update information may be received by a household appliance including a display, the household appliance receiving the update information having stored therein menu information defining menus forming a hierarchical structure and displaying the menus on the display in accordance with the menu information, in the hierarchical structure of the menus, a menu relating to the given household appliance may be at a level other than a top-most level, and the update information may be menu information for updating that places the menu relating to the given household appliance at a higher level in the hierarchical structure of menus.

According to this configuration, the menu configuration displayed by the other household appliance may be updated with an appropriate display for performing the cooperative processing with the given household appliance.

(5) Also, a specific household appliance among household appliances included in the combination information may have stored in advance a program for performing a function requiring an update, the program being inactive, and the update information transmitted to the specific household appliance may be a signal making an instruction to activate the program.

According to this configuration, cooperative processing is performable by improving functions in accordance with a given household appliance that is already registered in the registered information and another household appliance, despite the given household appliance not being provided in advance with a function for cooperative processing with the other household appliance.

(6) Also, a household appliance receiving the update information may perform a display enabling the user to select whether or not to execute an updated function, and may execute the updated function only when the user selects and thereby instructs to execute the updated function.

According to this configuration, an update for a function not desired by the user is prevented.

(7) Another aspect of the present disclosure is a function update system of a server and a plurality of household appliances, the function update system updating a function of a household appliance registered on the server, the server including: a storage unit storing: registration information listing identification information for each of a plurality of household appliances owned by a user; combination information listing a plurality of combinations of household appliances performing cooperative processing; and update information for each household appliance included in each of the combinations, for updating a function for performing the cooperative processing; a registration unit receiving, from a given household appliance having identification information not listed in the registration information, a request to list the identification information for the given household appliance in the registration information, and listing the identification information for the given household appliance in the registration information; a selection unit selecting a given combination among the combinations listed in the combination information, the given combination including the given household appliance and all other household appliances in the given combination being registered in the registration information; and an update unit transmitting update information to each household appliance requiring a function update in the given combination, wherein each household appliance receiving the update information updates a function by using the update information.

According to this configuration, cooperative processing is performable by improving functions in accordance with a given household appliance that is already registered in the registered information and another household appliance, despite the given household appliance not being provided in advance with a function for cooperative processing with the other household appliance.

INDUSTRIAL APPLICABILITY

A function update method pertaining to an aspect of the disclosure enables execution of cooperative processing by adding a function to a household appliance in accordance with the ownership of a different household appliance by the user, and is thus applicable to a system for control of a plurality of household appliances by the user.

REFERENCE SIGNS LIST 1, 1a Function update system
10, 10a Server
15 Home
20 Router
30-N Nth household appliance (N=1 to 8)
201 Communication unit
202 Storage unit
203 Input unit
204 Display unit
205 Control unit
301 Communication unit
302 Storage unit
303 Input unit
304 Display unit
305 Individual function unit
305 Control unit

The invention claimed is:

1. A function update method updating a function of a household appliance registered on a server, wherein
the server stores:
registration information listing identification information for each of a plurality of household appliances owned by a user;
combination information listing a plurality of combinations, each combination including a plurality of household appliances performing cooperative processing;
group information listing a plurality of groups, each group composed of two or more of the combinations listed in the combination information; and
update information for each household appliance included in each of the combinations, for updating a function for performing cooperative processing,
in any pair of combinations in any group, one of the pair of combinations includes all household appliances included in the other one of the pair of combinations,
the function update method comprises:
receiving, from a given household appliance having identification information not listed in the registration information, a request to list the identification information for the given household appliance in the registration information, and listing the identification information for the given household appliance in the registration information;
selecting the groups listed in the group information one by one, and choosing a given combination in a selected group, the given combination including the greatest quantity of household appliances among combinations in the selected group which include the given household appliance and in which all other household appliances in the given combination are registered in the registration information; and
transmitting update information to each household appliance requiring a function update in the given combination.

2. The function update method of claim 1, wherein
each household appliance includes a processor and storage storing a control program, and is operated by the processor executing the control program,
the update information is an update control program that includes an execution instruction for a function requiring updating, and
a household appliance receiving the update information stores the update information in the storage.

3. The function update method of claim 1, wherein
the update information is received by a household appliance including a display, the household appliance receiving the update information having stored therein menu information defining menus forming a hierarchical structure and displaying the menus on the display in accordance with the menu information, and
the update information is menu information for updating that adds a menu related to the given household appliance to the menus.

4. The function update method of claim 1, wherein
the update information is received by a household appliance including a display, the household appliance receiving the update information having stored therein menu information defining menus forming a hierarchical structure and displaying the menus on the display in accordance with the menu information,
in the hierarchical structure of the menus, a menu relating to the given household appliance is at a level other than a top-most level, and
the update information is menu information for updating that places the menu relating to the given household appliance at a higher level in the hierarchical structure of menus.

5. The function update method of claim 1, wherein
a specific household appliance among household appliances included in the combination information has stored in advance a program for performing a function requiring an update, the program being inactive, and
the update information transmitted to the specific household appliance is a signal making an instruction to activate the program.

6. The function update method of claim 1, wherein
a household appliance receiving the update information performs a display enabling the user to select whether or not to execute an updated function, and executes the updated function only when the user selects and thereby instructs to execute the updated function.

7. A function update system of a server and a plurality of household appliances, the function update system updating a function of a household appliance registered on the server, the server comprising:
a non-transitory storage medium storing:
registration information listing identification information for each of a plurality of household appliances owned by a user;
combination information listing a plurality of combinations of household appliances performing cooperative processing;
group information listing a plurality of groups, each group composed of two or more of the combinations listed in the combination information; and
update information for each household appliance included in each of the combinations, for updating a function for performing the cooperative processing;
a processor for controlling operations of the server to cause the server to perform:
receiving, from a given household appliance having identification information not listed in the registration information, a request to list the identification information for the given household appliance in the registration information, and listing the identification information for the given household appliance in the registration information;

selecting the groups listed in the group information one by one, and choosing a given combination included in a selected group, the given combination including the greatest quantity of household appliances among combinations in the selected group which include the given household appliance and in which all other household appliances in the given combination are registered in the registration information; and transmitting update information to each household appliance requiring a function update in the given combination, wherein each household appliance receiving the update information updates a function by using the update information, and in any pair of combinations in any given group, one of the pair of combinations includes all household appliances included in the other one of the pair of combinations.

* * * * *